United States Patent
Matsushita et al.

(10) Patent No.: US 10,120,601 B2
(45) Date of Patent: Nov. 6, 2018

(54) STORAGE SYSTEM AND DATA PROCESSING METHOD

(71) Applicant: Hitachi, Ltd., Tokyo (JP)

(72) Inventors: Takaki Matsushita, Tokyo (JP); Hiroaki Akutsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 118 days.

(21) Appl. No.: 15/117,779

(22) PCT Filed: Mar. 24, 2014

(86) PCT No.: PCT/JP2014/058037
§ 371 (c)(1),
(2) Date: Aug. 10, 2016

(87) PCT Pub. No.: WO2015/145532
PCT Pub. Date: Oct. 1, 2015

(65) Prior Publication Data
US 2016/0350021 A1    Dec. 1, 2016

(51) Int. Cl.
*G06F 3/06* (2006.01)
*G06F 12/00* (2006.01)
(Continued)

(52) U.S. Cl.
CPC .............. *G06F 3/0631* (2013.01); *G06F 3/06* (2013.01); *G06F 3/0613* (2013.01);
(Continued)

(58) Field of Classification Search
CPC .... G06F 3/0644; G06F 3/0647; G06F 3/0653; G06F 3/0655
See application file for complete search history.

(56) References Cited

U.S. PATENT DOCUMENTS 8,463,825 B1    6/2013 Harty et al.
8,880,830 B1    11/2014 Akutsu et al.
(Continued)

FOREIGN PATENT DOCUMENTS

JP    09-006678 A    1/1997
JP    2012-133731 A    7/2012
(Continued)

OTHER PUBLICATIONS

Masafumi Yamamoto, Step by Step Tintri VMstore Real machine Test Report, Tintri, Inc., 2013.
(Continued)

*Primary Examiner* — Edward J Dudek, Jr.
*Assistant Examiner* — Andrew Russell
(74) *Attorney, Agent, or Firm* — Mattingly & Malur, PC

(57) ABSTRACT

It is provided a storage system, comprising: a first storage device; a second storage device higher in I/O performance than the first storage device; a data amount reducing part configured to reduce a data amount of write data from a host computer; and a controller. The controller is configured to: change the storage area that is allocated to the specified logical area to a relocation destination storage area; manage an I/O load of the data and a reduction ratio of the data requested by the write request from the host computer to be written; determine whether or not data relocation is necessary by using the load per capacity reduction unit that is based on a size of the data reduced by the data amount reduction unit; and relocate the data that is determined as needing relocation between the first storage device and the second storage device.

14 Claims, 30 Drawing Sheets

(51) Int. Cl.
  *G06F 12/04* (2006.01)
  *G06F 12/08* (2016.01)
  *G06F 12/0873* (2016.01)
  *G06F 12/0897* (2016.01)

(52) U.S. Cl.
  CPC .......... *G06F 3/0638* (2013.01); *G06F 3/0647* (2013.01); *G06F 3/0683* (2013.01); *G06F 12/00* (2013.01); *G06F 12/04* (2013.01); *G06F 12/08* (2013.01); *G06F 12/0873* (2013.01); *G06F 12/0897* (2013.01); *G06F 3/0653* (2013.01); *G06F 2212/214* (2013.01); *G06F 2212/60* (2013.01)

(56) References Cited

U.S. PATENT DOCUMENTS

| | | | | |
|---|---|---|---|---|
| 8,949,208 | B1* | 2/2015 | Xu | G06F 3/0641 707/661 |
| 2006/0212625 | A1* | 9/2006 | Nakagawa | G06F 3/0608 710/68 |
| 2008/0172525 | A1* | 7/2008 | Nakamura | G06F 3/0608 711/113 |
| 2008/0307191 | A1* | 12/2008 | Lane | G06F 3/0608 711/209 |
| 2012/0166752 | A1* | 6/2012 | Taniyama | G06F 3/0664 711/170 |
| 2012/0185648 | A1* | 7/2012 | Benhase | G06F 12/08 711/118 |
| 2012/0246386 | A1 | 9/2012 | Akutsu et al. | |
| 2012/0317333 | A1 | 12/2012 | Yamamoto et al. | |
| 2013/0036277 | A1 | 2/2013 | Szczepkowski et al. | |
| 2013/0332652 | A1 | 12/2013 | Hayashi | |
| 2014/0013068 | A1 | 1/2014 | Yamato et al. | |
| 2015/0180936 | A1* | 6/2015 | Ichien | H04L 67/06 709/217 |

FOREIGN PATENT DOCUMENTS

| | | |
|---|---|---|
| JP | 2013-514561 A | 4/2013 |
| WO | 2012/124100 A1 | 9/2012 |
| WO | 2013/186828 A1 | 12/2013 |

OTHER PUBLICATIONS

Toru Moriyama, Virtual Environment "Dedicated" Storage, Nikkei Computer, Mar. 21, 2013.
International Search Report of PCT/JP2014/058037 dated Jun. 17, 2014.

* cited by examiner

| 801 | 802 | 803 | 804 | 805 | 806 | 807 |
|---|---|---|---|---|---|---|
| POOL NUMBER | VIRTUAL VOLUME NUMBER | VIRTUAL LOGICAL ADDRESS | POOL VOLUME NUMBER | POOL LOGICAL ADDRESS | MONITORING INFORMATION INDEX NUMBER | COMPRESSION RATIO |
| 1 | 1 | 0x0000 | 204 | 0x0040 | 1 | 80% |
| 1 | 1 | 0x0010 | 201 | 0x0050 | 2 | 50% |
| 1 | 2 | 0x0000 | 203 | 0x0020 | 3 | 50% |
| 1 | 2 | 0x0030 | 202 | 0x0040 | 4 | 40% |
| 1 | 2 | 0x0020 | 201 | 0x0010 | 5 | 90% |

| 901 | 902 | 903 | 904 | 905 | 906 | 907 |
|---|---|---|---|---|---|---|
| POOL VOLUME NUMBER | PG NUMBER | PHYSICAL DRIVE NUMBER | PHYSICAL START ADDRESS | STATE | REDUCED PAGE COUNT | ADDABLE PAGE COUNT |
| 201 | 10 | 0x1000 0x1001 0x1002 0x1003 | 0x0000 | NORMAL | 0 | 300 |
| 202 | 11 | 0x1004 0x1005 0x1006 0x1007 | 0x0000 | DEPLETED | 100 | 0 |
| 203 | 11 | 0x1004 0x1005 0x1006 0x1007 | 0x1000 | DEPLETED | 100 | 0 |
| 204 | 12 | 0x1008 0x1009 0x100A 0x100B | 0x0000 | DEPLETION THRESHOLD EXCEEDED | 50 | 0 |

| MONITORING INFORMATION INDEX NUMBER | LONG CYCLE I/O COUNTER (SIDE A) | LONG CYCLE I/O COUNTER (SIDE B) | TEMPORARY COUNTER | LAST TEMPORARY COUNTER COMPLETION TIME | LOAD PER CAPACITY COMPRESSION UNIT (LONG CYCLE) |
|---|---|---|---|---|---|
| 1 | 1000 | 2000 | 12 | 2013/4/8 12:30:45 | 1250 |
| 2 | 650 | 12124 | 0 | 2013/4/8 10:10:23 | 1300 |
| 3 | 232 | 123 | 4 | 2013/4/8 12:20:12 | 464 |
| 4 | 35 | 32 | 5 | 2013/4/8 10:30:47 | 875 |
| 5 | 2 | 325 | 62 | 2013/4/6 17:30:32 | 2 |

FIG. 10

| POOL UMBER | LOAD LEVEL (LOAD VALUE) PER CAPACITY COMPRESSION UNIT | PAGE COUNT |
|---|---|---|
| 1 | 0 (0) | 1190 |
| | 1 (10) | 123 |
| | 2 (100) | 14 |
| | 3 (1000) | 4 |
| | 4 (10000) | 2 |
| 2 | 0 (0) | 1190 |
| | 1 (10) | 123 |
| | 2 (100) | 14 |
| | 3 (1000) | 4 |
| | 4 (10000) | 2 |

605

| VIRTUAL VOLUME NUMBER | LOAD LEVEL (LOAD VALUE) PER CAPACITY COMPRESSION UNIT | PAGE COUNT |
|---|---|---|
| 1 | 0 (0) | 1190 |
| | 1 (10) | 123 |
| | 2 (100) | 14 |
| | 3 (1000) | 4 |
| | 4 (10000) | 2 |
| 2 | 0 (0) | 1190 |
| | 1 (10) | 123 |
| | 2 (100) | 14 |
| | 3 (1000) | 4 |
| | 4 (10000) | 2 |

STORAGE SYSTEM AND DATA PROCESSING METHOD

BACKGROUND

This invention relates to automatic tier control of a storage system that has a plurality of storage medium tiers.

The popularization of solid state drives (SSDs), which are faster than hard disk drives (HDDs), has brought a diversification of storage media that are installed in a storage system, and efficient use of storage medium tiers, particularly high performance tiers, is now a matter to be solved. As a solution to this matter, an automatic storage tier placement function has become popular with which data is automatically stored in an appropriate storage medium based on the I/O load of the data. For instance, a monitoring system is disclosed in US 2012/0246386 A1, in which a load index value defined from the viewpoint of a long cycle and a load index value defined from the view point of a short cycle are updated based on the number of I/Os that is counted cyclically for each storage area. Promotion (moving a page to an upper tier) and demotion (moving a page to a lower tier) are executed based on a value that is calculated from the load index values.

Meanwhile, data compression technologies and data deduplication technologies are popular as solutions to the matter of an increased data amount. The I/O of compressed or deduplicated data usually requires data restoration processing, e.g., decompression, which causes a drop in I/O performance. Technologies that use a fast compression function in an SSD to reduce the amount of data while maintaining I/O performance have been proposed. For instance, a storage system that includes a plurality of flash packages and a storage controller configured to receive a write request from a host and to transmit data requested in the write request to one of the plurality of flash packages that is the write destination is disclosed in US 2012/0317333 A1. The storage controller defines, for each flash package, a virtual capacity larger than the physical capacity of the flash package. The storage system compresses write data, and writes the compressed write data to the write destination flash package.

A larger amount of heavy-load data can be placed in upper-tier storage media by using the tier placement function described above in combination with a fast data amount reducing function that does not affect I/O performance. The hit ratio of upper tiers in this case is higher than when the tier placement function is used alone, and an improvement in I/O performance is accordingly expected.

SUMMARY

However, simply using the tier placement function and the fast data amount reducing function in combination may result in upper tiers being occupied by data that is heavy in load but low in data reduction ratio. This makes the performance substantially the same as when the tier placement function is used alone, thereby losing the merit of the fast data amount reducing function. It is therefore an object of this invention to maximize the data hit ratio in upper tiers by implementing data placement that takes the I/O load and the data reduction ratio into consideration.

The representative one of inventions disclosed in this application is outlined as follows. There is provided a storage system, comprising: a first storage device; a second storage device higher in I/O performance than the first storage device; a data amount reducing part configured to reduce a data amount of write data from a host computer; and a controller. The controller is configured to: provide the host computer with virtual volumes, each of which includes a plurality of logical areas; allocate a storage area of one of the first storage device and the second storage device to a logical area specified by the received write request after a write request to one of the virtual volumes is received from the host computer; store data requested by the write request to be written in the allocated storage area; relocate the stored data between the first storage device and the second storage device; change the storage area that is allocated to the specified logical area to a relocation destination storage area; manage an I/O load of the data and a reduction ratio of the data requested by the write request from the host computer to be written; determine whether or not data relocation is necessary by using the load per capacity reduction unit that is based on a size of the data reduced by the data amount reduction unit; and relocate the data that is determined as needing relocation between the first storage device and the second storage device.

According to the exemplary embodiment of this invention, the data hit ratio of upper tiers can be improved. Other objects, configurations, and effects than those described above are made clear in the description of embodiments of this invention given below.

BRIEF DESCRIPTION OF THE DRAWINGS

FIG. 8 is a diagram for illustrating a configuration of a dynamic mapping table.

FIG. 9 is a diagram for illustrating a configuration of a logical-physical address conversion table.

FIG. 10 is a diagram for illustrating a configuration of a page-by-page monitoring table.

FIG. 11 is a diagram for illustrating a configuration of a pool frequency distribution table and a virtual volume frequency distribution table.

DETAILED DESCRIPTION OF THE PREFERRED EMBODIMENTS

Now, referring to the accompanying drawings, a description is given of the embodiment of this invention. In the accompanying drawings, components that are functionally the same are sometimes denoted by the same reference symbols. The accompanying drawings are illustrations of specific embodiment and examples in conformity with the principle of this invention. Those embodiment and examples are used for the understanding of this invention and are never used to limit the interpretation of this invention.

In addition, as described later, the embodiment of this invention may be implemented by software running on a general purpose computer, by dedicated hardware, or by a combination of software and hardware.

In the following description, information for management is described in a "table" form, but the information for management do not necessarily need to be expressed as a data structure based on the table, and may be expressed by data structures such as a list, a DB, and a queue, or in another form, e.g., a directory structure. For that reason, "table", "list", "DB", "queue", and the like are sometimes referred to simply as "information" in order to indicate independence of the data structure.

In the following, a description may be given of each processing according to the embodiments of this invention by using "program" as a subject (operation subject). The description may be given by using a processor as the subject because the program performs predetermined processing by being executed by the processor while using a memory and a communication port (communication control device). A part or the entirety of the program may be realized by dedicated hardware on may be modularized. Different kinds of programs may be installed or each computer through a program distribution server or a storage medium.

The following description takes data compression as an example of the way to reduce the data amount, but can also be read with data deduplication substituting for data compression. In data deduplication processing, the total amount of data held is reduced by detecting duplicate pieces of data from among a plurality of pieces of data, holding only one piece of shared data, and associating a plurality of pieces of data with the shared data.

First Embodiment

Figure 1:
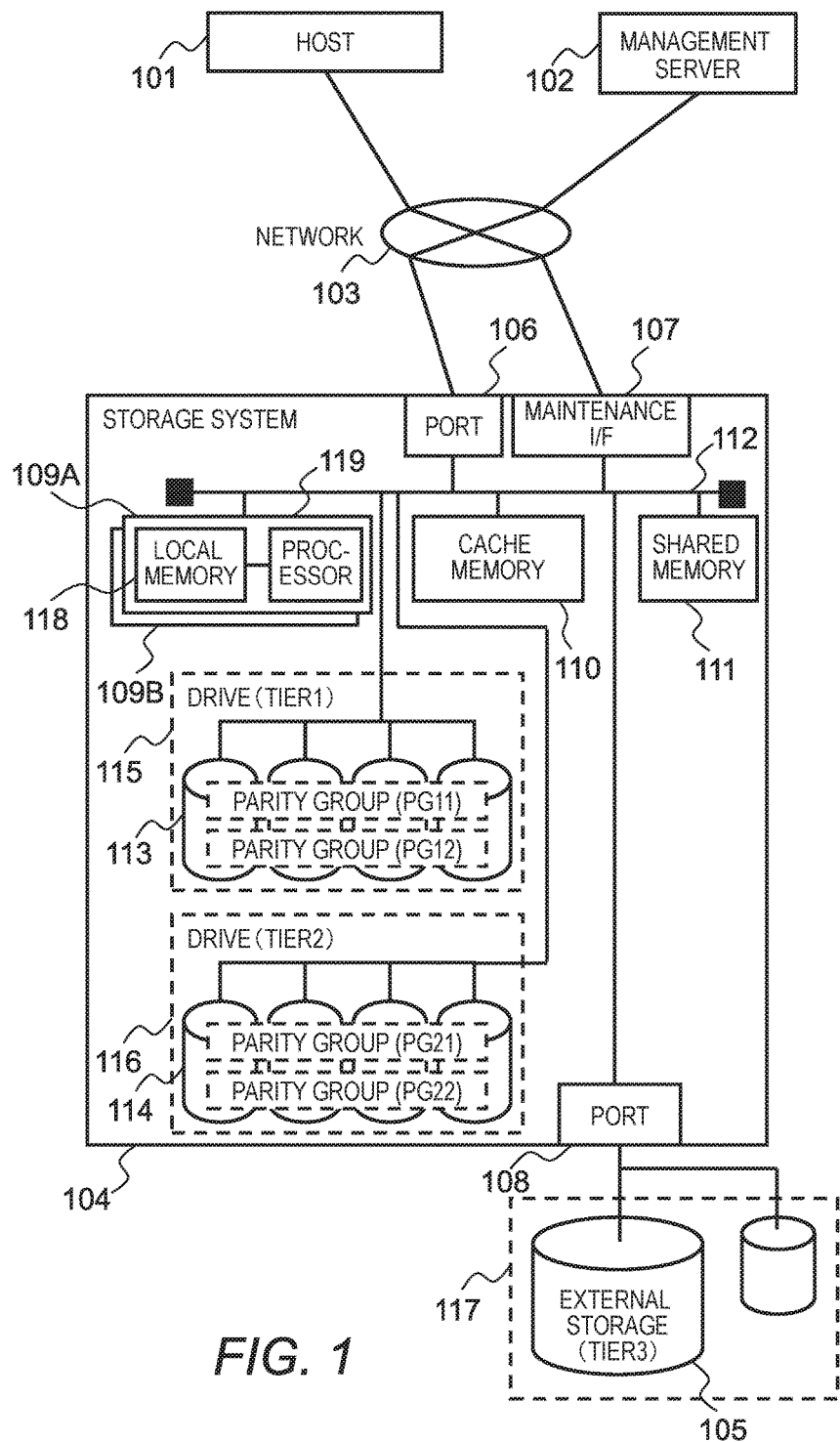
FIG. 1 is a diagram for illustrating an example of a configuration of a computer system according to a first embodiment of this invention.

FIG. 1 is a diagram for illustrating an example of a configuration of a computer system according to a first embodiment of this invention. A host 101 includes, for example, a general server and is coupled to a port 106 of a storage system 104 via a network 103. The host 101 issues data read commands and data write commands to the storage system 104, which executes data read and data write as commanded. The network 103 is, for example, a storage area network (SAN) or an Ethernet. A management server 102 is coupled to a maintenance I/F 107 or a port 108 of the storage system 104 via the network 103. A storage administrator uses the management server 102 to transmit various settings necessary to run the storage system and commands for management to the storage system 104. External storage 105, if included, is coupled to the port 108 of the storage system 104. The external storage 105 may be coupled to the port 108 of the storage system 104 via the network 103. Volumes provided by the external storage 105 can be treated the same in the storage system 104 as volumes within the storage system 104. A specific method thereof is described in US 2012/0317333 A1, and a description on details of the method is omitted here.

The internal configuration of the storage system 104 is described next. Inside the storage system 104, the port 106, the maintenance I/F 107, at least one processor package 109, a cache memory 110, a shared memory 111, the port 108, a drive 113, and a drive 114 are coupled to one another via an internal network 112. The cache memory 110 is a memory that allows quick access for temporary storage of data as a cache in order to improve the throughput and response in I/O processing of the storage system 104. The storage system 104 may include a plurality of processor packages 109 each of which includes a local memory 118 and a processor 119 to serve as a storage controller. The processor 119 is configured to transfer data among the drives 113 and 114, the external storage 105, and the cache memory 110 in order to process read commands and write commands from the host 101. The shared memory 111 is a memory configured to store control-use information necessary for the processor 119 to process read commands and write commands and to execute storage functions (such as a volume copying function). The information stored in the shared memory 111 is shared between the processor 119 of the processor package 109A and the processor 119 of the processor package 109B. The local memory 118 is a memory configured to store control-use information necessary for the processor 119 to process read commands and write commands and to execute storage functions, and is a storage area that the processor 119 can use exclusively. The local memory 118 stores, for example, a program executed by the processor 119.

The drives 113 and 114 include a plurality of types of drives different from one another in performance. Examples of the included drives are hard disk drives having a Fibre Channel (FC) interface, a Serial Attached SCSI (SAS) interface, a Serial Advanced Technology Attachment (SATA) interface, or other interfaces, and solid state drives (SSDs), which are higher in I/O throughput performance and I/O response performance than hard disk drives. The drives of a plurality of types are sorted into groups of drives that are close to one another in performance as tiers 115, 116, and 117. The relationship between the tiers is defined by a performance-level relation. The drive group having the highest performance (for example, SSDs) is usually defined as Tier 1, and the remaining drive groups are similarly defined as Tier 2 and Tier 3 in descending order of performance. Drives in the external storage 105 may be managed as the lowest tier on the assumption that the drives coupled as the external storage 105 are old models that are no longer in use and have low performance. Alternatively, a tier appropriate for the performance of the external storage 105 may be set by a user via a management I/F.

Parity groups (PGs) are formed from a plurality of drives in each tier. In each parity group, a RAID, for example, is formed from a plurality of drives to avoid a loss of stored data in the event of a failure in one of the plurality of drives.

Figure 2:
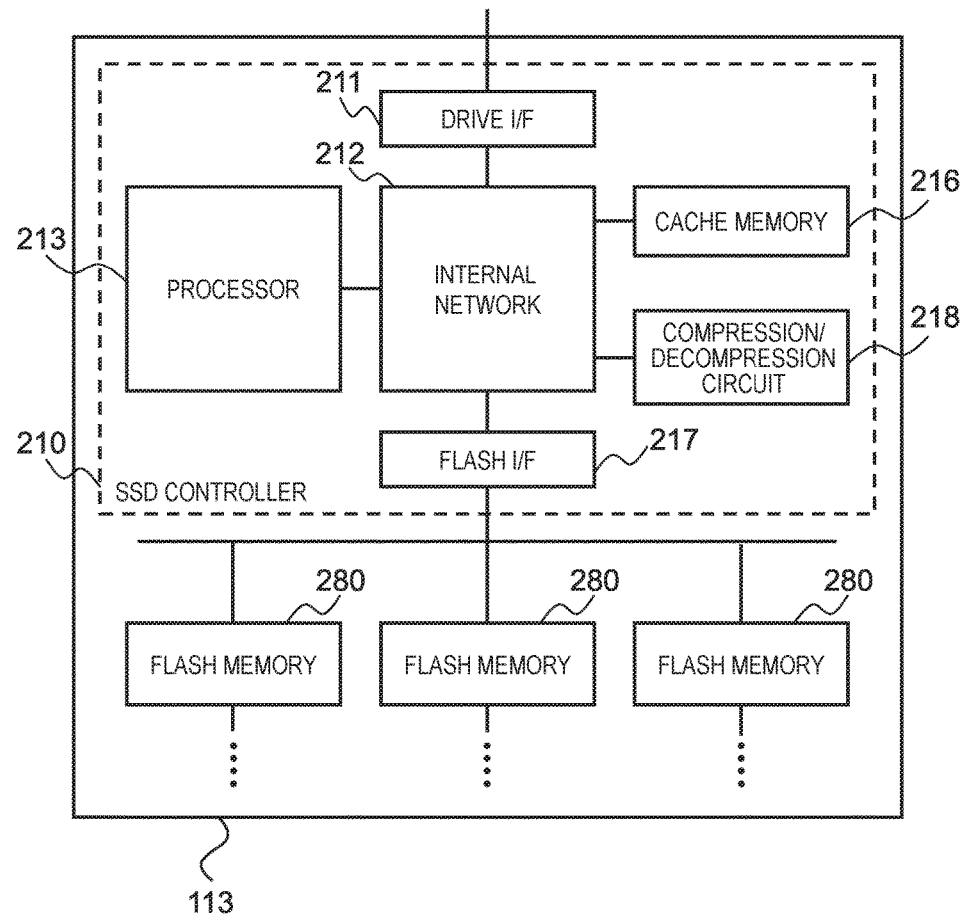
FIG. 2 is a diagram for illustrating an example of a configuration of a drive (SSD).

FIG. 2 is a diagram for illustrating an example of a configuration of the drive (SSD) 113. The SSD includes a plurality of flash memories 280 and an SSD controller 210, which is coupled to the flash memories 280. The SSD controller 210 is configured to control the operation of the drive (SSD) 113. The SSD controller 210 includes communication interface devices, a memory, a control device coupled to the communication interface devices and to the memory, and a hardware device configured to execute data compression and decompression. The communication interface devices are a drive I/F 211 on the front end side and a flash I/F 217 on the back end side. The memory is a cache memory 216. The control device is a processor 213. The hardware device configured to execute data compression and decompression is a compression/decompression circuit 218. The function of compressing and decompressing data may instead be implemented by way of software by running a dedicated program with the processor 213. The drive I/F 211, the processor 213, the cache memory 216, the flash I/F 217, and the compression/decompression circuit 218 are coupled to one another via an internal network 212.

The drive I/F 211 is coupled to each processor 119 in the storage system 104 by the internal network 112. The internal network 212 is a network that couples the devices within the SSD 113. The internal network 212 may include a switch. The internal network 212 may also use an ASIC that has a switching function. The processor 213 handles overall control of the drive (SSD) 113. The cache memory 216 has an area in which a computer program and data that are necessary for the processor 213 to control the drive (SSD) 113 are stored. The flash I/F 217 is an interface configured to couple the SSD controller 210 and the flash memories 280.

The drive (SSD) 113 in this embodiment is a semiconductor storage medium that includes the plurality of flash memories 280 and the SSD controller 210 configured to control the flash memories 280, and is not limited to the exterior appearance, shape, and the like of the form factor. Non-volatile semiconductor memories such as NORs and NANDs can be used as the flash memories 280. The flash memories 280 may be replaced with various semiconductor memories such as magnetoresistive random access memories (MRAMs), which are magnetoresistive memories, resistance random access memories (ReRAMs), which are resistance variable memories, and ferroelectric random access memories (FeRAMs), which are ferroelectric memories.

Figure 3:
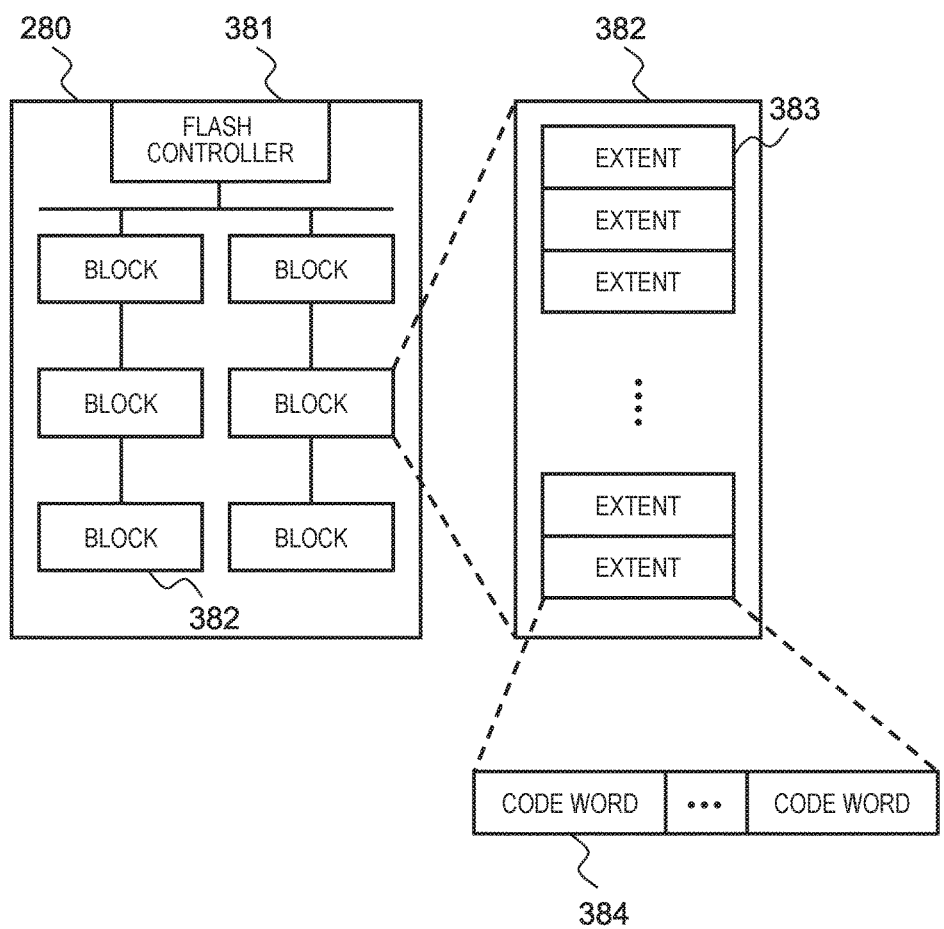
FIG. 3 is a diagram for illustrating an example of a configuration of a flash memory.

FIG. 3 is a diagram for illustrating an example of a configuration of the flash memories 280. Each flash memory 280 includes a plurality of blocks 382 and a flash memory controller (hereinafter shortened to "flash controller") 381 coupled to the blocks 382. The flash controller 381 is configured to control the flash memory 280. Each block 382 includes a plurality of extents 383. Data read out of the flash memory 280 and data write to the flash memory 280 are executed on an extent-by-extent basis. Data deletion is executed on a block-by-block basis. Each extent 383 includes a plurality of code words 384. Each code word 384 stores data that is stored by the host 101 and an ECC that is an error correction code for protecting the data.

The flash memory 280 is, for example, a NAND flash memory. Data cannot be overwritten in NAND flash memories. Therefore, when new data is to be written in the extent 383 where data has been written, the flash memory 280 deletes the existing data, and writes the new data in the deletion-completed extent 383 from which the existing data is now deleted.

The SSD controller 210 executes processing of leveling the deletion count among the plurality of blocks 382 in the drive (SSD) 113. Specifically, the SSD controller 210 levels the deletion count among the blocks 382 in the drive (SSD) 113 by storing data that has a low update frequency in the block 382 that has a high deletion count, and storing data that has a high update frequency in the block 382 that has a low deletion count. The SSD controller 210 may also level the deletion count by storing write data in the block 382 that has a low deletion count. The SSD controller 210 in this case may sort the plurality of blocks 382 into a plurality of groups by deletion count to select the block 382 in which the write data is to be stored from a group that is low in deletion count. Leveling the deletion counts of the plurality of blocks 382 in the drive (SSD) 113 in this manner extends the life of the drive (SSD) 113.

Figure 4:
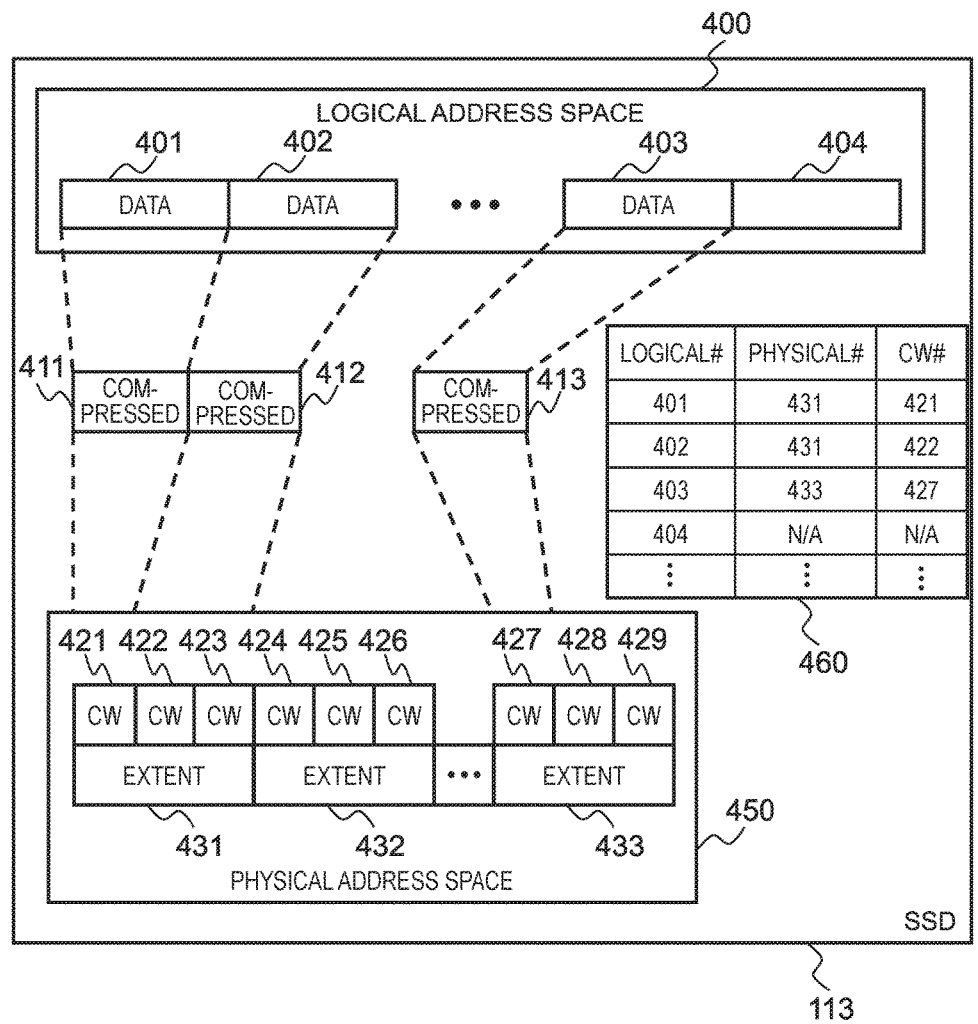
FIG. 4 is a diagram for illustrating an example of a configuration of address spaces in the SDD.

FIG. 4 is a diagram for illustrating an example of a configuration of address spaces in the SDD. The drive (SSD) 113 includes a physical address space 450 and a logical address space 400, which is larger than the physical address space 450. The physical address space 450 is the address space of a physical storage area in which actual data is stored. The logical address space 400, on the other hand, is an address space that the drive (SSD) 113 provides to the processors 119 of the storage system 104. The processors 119 specify an address in the logical address space 400 to read/write data.

The SSD controller 210 divides the logical address space 400 into a plurality of areas (hereinafter referred to as "logical extents") 401, 402, and 403, each of which has, for example, the same size as the physical extent size. The drive (SSD) 113 in this embodiment has a data compression function, which means that data in the logical extent 401, data in the logical extent 402, and data in the logical extent 403 are converted (compressed) into compressed data 411, compressed data 412, and compressed data 413, respectively. Because the compression ratio varies depending on the data pattern or other factors, the pieces of compressed data created through the conversion of the logical extents are not always constant in size and have arbitrary sizes. The pieces of compressed data are stored in physical extents on a code word (CW)-by-code word basis. In FIG. 4, the compressed data 411 is stored in a CW 421, the compressed data 412 is stored in a CW 422 and a CW 423, and the compressed data 413 is stored in a CW 427.

The mapping between the logical extents (401 and others) and the physical extents (431 and others) is recorded in a logical-physical conversion table 460. In this embodiment, where the drive (SSD) 113 includes the compression/decompression circuit 218 as illustrated, a plurality of logical extents may be mapped onto a single physical extent. The logical extent 401 and the logical extent 402 are stored in the same physical extent 431 in FIG. 4. In addition, because the logical extents are associated with the logical address space 400, a logical extent that has never been the destination of data write from one of the processors 119 is not actually allocated a physical extent. Information about which physical extent is associated with the logical extent 404 is invalid information in this case.

The drive (SSD) 113 with a data compression function thus does not have a one-to-one relationship between logical extents and physical extents, and instead dynamically allocates a physical extent to compressed data that is actually stored in one of the flash memories 280. The drive (SSD) 113 where the logical address space 400 is larger than the physical address space 450 also allows the processors 119 of the storage system 104 to write data in an amount that exceeds the physical storage capacity of the drive (SSD) 113.

How large the logical address space 400 should be is discussed. In this embodiment, the size of the logical address space 400 is determined on the assumption that every piece of write data is compressed at the best compression ratio (for example, 1/8) that the compression/decompression circuit 718 can achieve. The drive (SSD) 113 in this case provides the logical address space 400 that has a logical capacity eight times larger than the physical capacity of the storage area of the drive (SSD) 113 to the processors 119 of the storage system 104. For example, when the best compression ratio is 1/8, the drive (SSD) 113 that has a physical capacity of 1 TB provides a logical capacity of 8 TB to the processors 119 of the storage system 104. This enables the processors 119 of the storage system 104 to store data in an amount that exceeds the actual physical capacity of the drive (SSD) 113 by simply writing data as in the case of the drive 114 (SAS HDD) and an SSD that does not have a compression function.

The actual compression ratio of written data may be poorer than 1/8 in some cases because the compression ratio of written data varies depending on the data pattern or other factors. Consequently, the drive (SSD) 113 may only be able to store less data than 8 TB from the processors 119 of the storage system 104. This state, where the physical capacity becomes full before the logical capacity of the drive (SSD) 113 becomes full, is called a depleted state.

The processors 119 of the storage system 104 cannot write data to the drive (SSD) 113 that is in a depleted state. A write command to the drive (SSD) 113 in a depleted state results in an error response. This is because, as described above, the NAND type flash memories 280 do not allow simple overwriting of data, and writing new data on a page where data is already stored requires deletion of the existing data and subsequent writing on the deletion-completed page from which the existing data is now deleted. The drive (SSD) 113 in a depleted state therefore cannot prepare a deletion-completed page and the write command results in an error response. The drive (SSD) 113 that is in a non-depleted state, on the other hand, has no write limitations and data can be written at any address in the logical address space 400.

To prevent the drive (SSD) 113 from falling into a depleted state and to keep the drive (SSD) 113 in a non-depleted state, the processors 119 of the storage system 104 execute an SSD depletion determining processing program 708, which is described later.

The SSD controller 210 can accomplish the leveling of the deletion count throughout the drive (SSD) 113 and the like by dynamically changing the mapping between the address range of the logical address space 400 (the logical storage area) and the address range of the physical address space 450 (the physical storage area). The association between the logical address space 400 and the physical address space 450 is managed by the processor 213 with the use of the logical-physical conversion table within the drive (SSD) 113. A specific method thereof is described in US 2012/0317333 A1, and a description on the method is omitted here.

The processors 119 of the storage system 104 in this embodiment do not directly manage the logical-physical conversion table within the drive (SSD) 113. Unless the processor 213 of the drive (SSD) 113 notifies the processors 119 of the storage system 104 of SSD internal information and the like, the processors 119 of the storage system 104 have no way of finding out the association relation between the logical address space 400 and the physical address space 450.

Figure 5:
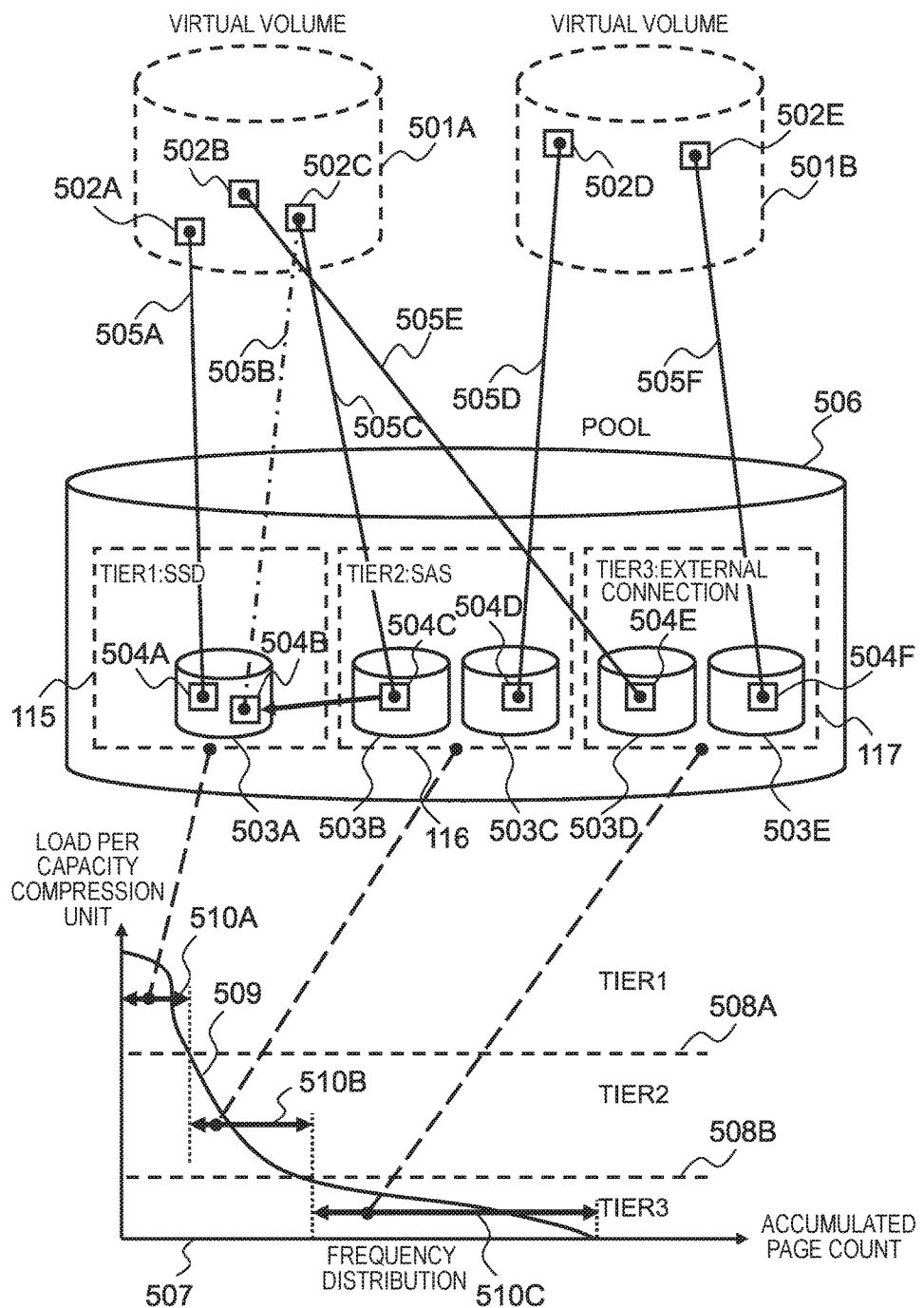
FIG. 5 is a diagram for illustrating a logical configuration of a storage system.

FIG. 5 is a diagram for illustrating the logical configuration of the storage system 104 according to the first embodiment of this invention. Virtual volumes 501 provided by the processors 119 to the host 101 are logical storage areas recognized by the host 101, and data is read out of or written to the virtual volumes 501 in response to a read or write command from the host 101. A pool 506 includes at least one pool volume 503. Each pool volume 503 is created from the storage area of any one of the drive (SSD) 113, the drive (SAS HDD) 114, and the external storage 105, and is classified by the tier to which the drive belongs. This embodiment includes three tiers, specifically, the SSD's tier 115 (corresponds to a pool volume 503A), the SAS HDD's tier 116 (corresponds to pool volumes 503B and 503C), and the external connection tier 117 (corresponds to pool volumes 503D and 503E). The pool volume 503A, which is created from the storage area of the drive (SSD) 113, is an area in the logical address space 400 in FIG. 4.

In the case where the host 101 issues a write command, the relevant processor 119 allocates an unused storage area in given units (in pages) from the pool 506 to a storage area in the virtual volumes 501 that is specified by the write command (505A). The next read/write command issued to the same page from the next host 101 is processed as I/O processing that is executed by the host 101 on the virtual volume, by executing I/O processing on the already allocated area of the pool volume 503. The limited storage capacity can be used efficiently by allocating, with the use of the virtual volumes 501, an area of the pool volumes 503 only to a part that is put into use.

Each virtual volume is made up of pages 502, and the characteristics of I/O processing executed by the host vary from one page 502 to another (this is called access locality). For instance, the overall performance of a system having a mixture of pages that are heavy in I/O load and pages that are light in I/O load generally improves when pages of heavy I/O load are placed in an upper tier. An example in which the SSD's tier 115 is capable of processing at 100 IOPS and the SAS HDD's tier 116 is capable of processing at 10 IOPS is discussed. In the case where the SAS HDD's tier 116 is allocated to a page 502C, which has a characteristic of 50 IOPS, and the SSD's tier 115 is allocated to a page 502A, which has a characteristic of 20 IOPS, in this example, the storage system 104 on the whole can only operate at 35-IOPS performance (10 IOPS (the upper limit of the SAS HDD's tier)+25 IOPS=35 IOPS) because the ratio of IOPS from the host to pages is basically constant in most cases. This state is called a neck. If the page 502C can be promoted from the SAS HDD's tier 116 to the SSD's tier 115, the storage system 104 delivers 70-IOPS performance (50+20=70) on the whole.

Figure 22:
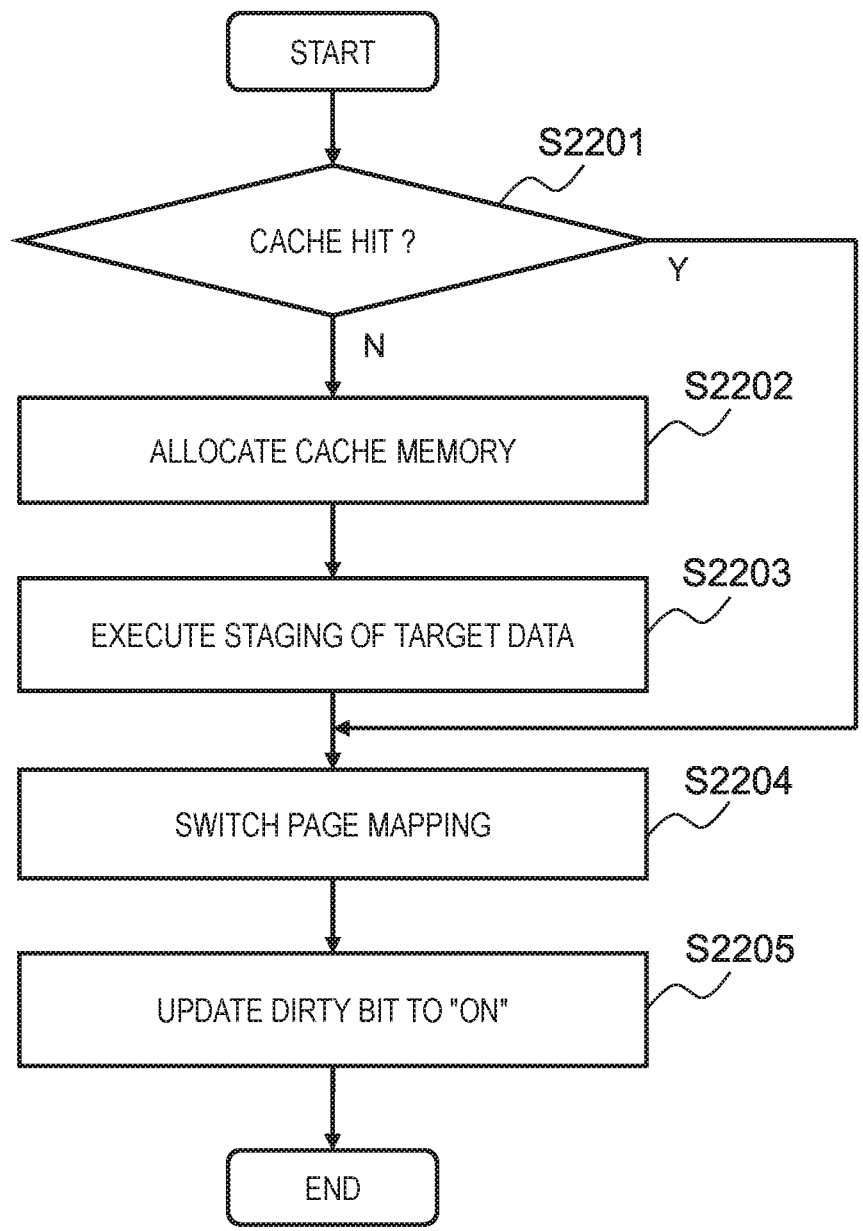
FIG. 22 is a flow chart of processing that is executed by a page relocation processing program.

This promotion is executed specifically by copying data of a page 504C to an unused page 504B, and changing an association (505C) between the page 502C of the virtual volume 501A and the page 504C of the pool volume 503B to an association (505B) between the page 502C of the virtual volume 501A and the page 504B of the pool volume 503A (S2204 in FIG. 22). The same configuration can also be used in data relocation through demotion.

A frequency distribution 507 indicates the distribution of loads per capacity compression unit of the respective pages. In this embodiment, compression-unit capacity is the size of each code word 384 in FIG. 3, and the minimum allocation size of an area in which compressed data is stored. A graph 509 is drawn by plotting all pages in descending order of load per capacity compression unit from the left-hand side of the drawing. The axis of ordinate represents the load per capacity compression unit and the axis of abscissa represents the accumulated page count. Tier allocation thresholds 508 (=T) are load thresholds used to determine which page is to be allocated to which tier. For example, a page belonging to a range 510A, which ends at an intersecting point between a tier allocation threshold 508A and the frequency distribution graph 509 and which includes a point where the load per capacity compression unit of a page is the heaviest, is allocated to the tier 115 of Tier 1 (the SSD in this embodiment). A page belonging to a range 510B, which starts from the intersecting point between the tier allocation threshold 508A and the frequency distribution graph 509 and which ends at an intersecting point between a tier allocation threshold 508B and the frequency distribution graph 509, is allocated to the tier 116 of Tier 2 (the SAS HDD in this embodiment). A page belonging to a range that starts from an intersecting point between the tier allocation threshold 508B and the frequency distribution graph 509 and that ends at a point where the load is minimum is allocated to the tier 117 of Tier 3 (the external storage in this embodiment). In this manner, pages are allocated to upper tiers first and then lower tiers in descending order of load per capacity compression unit.

The tier allocation thresholds 508 may be specified by the storage administrator or may be calculated by the storage system 104. Initial values of the tier allocation thresholds 508 (at a stage where the frequency distribution is not created yet after the storage system is activated) may be set to, for example, 0 to allocate pages to upper tiers first and then lower tiers without leaving unallocated areas between tiers. The tier allocation thresholds 508 are thus determined by creating the distribution of loads per capacity compression unit of pages that are consumed in units of the post-compression data size, instead of creating a load distribution from the I/O count per page that is consumed in units of pre-compression data size. More pages that are heavy in load can accordingly be placed in the SSD's tier 115, thereby improving the hit ratio of upper tiers.

Figure 28:
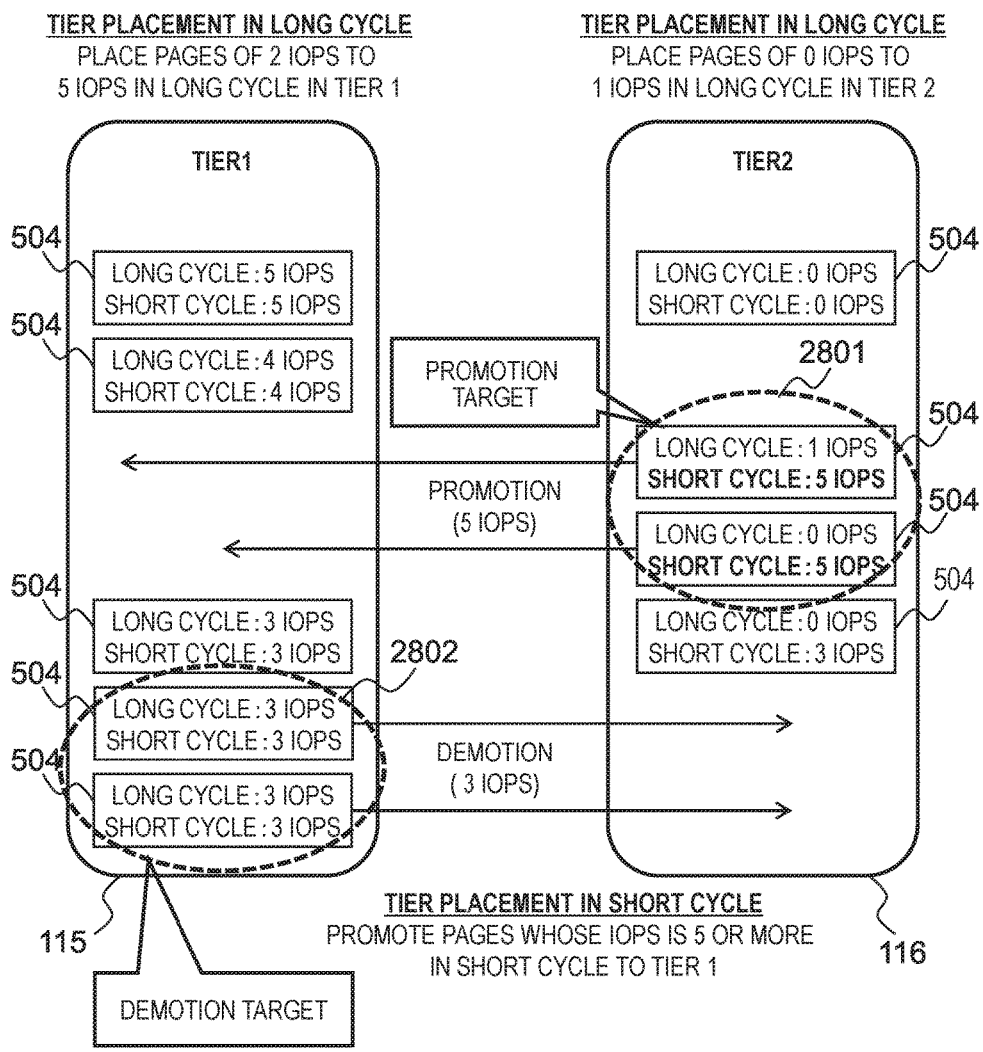
FIG. 28 is a diagram for illustrating a concept of page placement in this embodiment.

The concept of page placement in this embodiment is described with reference to FIG. 28. The basic page placement in this present invention is determined based on monitoring that is conducted in fixed cycles (long cycles). Specifically, pages are sorted by, as illustrated in FIG. 5, determining the tier allocation thresholds 508 (denoted by the variable 7) from the pool frequency distribution 507, which is created based on page monitoring information collected in long cycles and on the page compression ratio. In the example of FIG. 28, a page having a long cycle load (long cycle IOPS) in which T is 2 or more is placed in Tier 1, and a page having a long cycle IOPS in which T is less than 2 is placed in Tier 2. A page that remains large in load amount over a long cycle is thus often expected to have Tier 1-hitting performance that is stable when viewed in a long cycle. Stationary page placement tiers are therefore determined based on the long cycle IOPS and the compression ratio in this invention. On the other hand, a page where an extremely heavy load lasts for a short interval (several seconds to several minutes) is sometimes found through an analysis of general I/O patterns. If such rises in I/O load are dealt with by simply shortening the relocation cycle and executing promotion quickly, a large number of pages in which the load attenuates within a short period are demoted to lower tiers, with the result that the overall upper tier data hit ratio is impaired.

To solve this, basic placement that is determined with the long cycle as a reference is executed in combination with inter-tier data relocation that uses a reference different from the one for the basic placement by taking short cycle loads (short cycle IOPSs) into consideration. Specifically, a long cycle/short cycle load is identified based on thresholds that are determined with long cycle loads as a reference (the tier allocation thresholds 508), a page to be demoted in the short cycle is selected, and demotion is executed for the selected page (short cycle demotion). A page having a short cycle IOPS that exceeds long cycle/short cycle load of the page to be demoted by a determined value or more is selected as a page to be promoted in the short cycle, and promotion is executed for the selected page (short cycle promotion). Tier relocation determination is further executed in conjunction with I/O from the host 101, instead of depending on the pre-determined length of the cycle, by taking into account the high possibility that the loads of the pages promoted/demoted in the short cycle promotion/demotion described above are sudden loads and therefore attenuate within a shorter time than the length of the cycle. With this configuration, the overall Tier 1-hitting ratio may be improved by placing pages where the load (load per capacity compression unit) suddenly becomes heavy in Tier 1 as well as pages where the load is heavy over a long cycle, while paying attention to the stable Tier 1-hitting ratio of the long cycle.

For example, the long cycle load of a page group 2802 is 3 IOPS, which is the lightest long cycle load among pages in Tier 1, and the short cycle load of the page group 2802 is also 3 IOPS. The short cycle load of a page group 2801 is 5 IOPS and is heavier than the long cycle load of the pages to be demoted which is 3 IOPS. Temporarily switching the pages of the page group 2801 and the pages of the page group 2802 therefore accomplishes a Tier 1-hitting ratio higher than when pages are placed with only the long cycle as a reference.

When executing the short cycle promotion/short cycle demotion described above, priority is to be given basically to promotion to Tier 1 (the uppermost tier) and demotion from Tier 1 which is for allocating a free page area necessary to execute the promotion to Tier 1. This is because the drive response of Tier 1 is the lowest, except for special cases such as when the load is heavy, and setting Tier 1, which is the uppermost tier, as the relocation destination of the short cycle promotion is the most effective way to shorten the overall average response time.

In view of the above, Tier 1 is a target of short cycle relocation in this embodiment. However, when there are three or more tiers, tiers lower than Tier 1 may additionally be counted as targets of the short cycle relocation. The order of priority may also be determined to set the tiers dynamically as targets of the short cycle relocation in ascending order of the average drive response time of the tiers. For example, because the response of each tier varies depending on the drive operating rate of the tier, the response time of Tier 1 may exceed the response time of Tier 2 or Tier 3 when the operating rate of Tier 1 is very high. In the case where the original performance of Tier 1 and the original performance of Tier 2 are reversed such as when the average drive response of Tier 1 is 10 milliseconds and the average drive response of Tier 2 is 5 milliseconds, the short cycle promotion and short cycle demotion disclosed in this patent application may be executed as promotion to Tier 2 and demotion for allocating a free page area necessary for the promotion to Tier 2.

Figure 6:
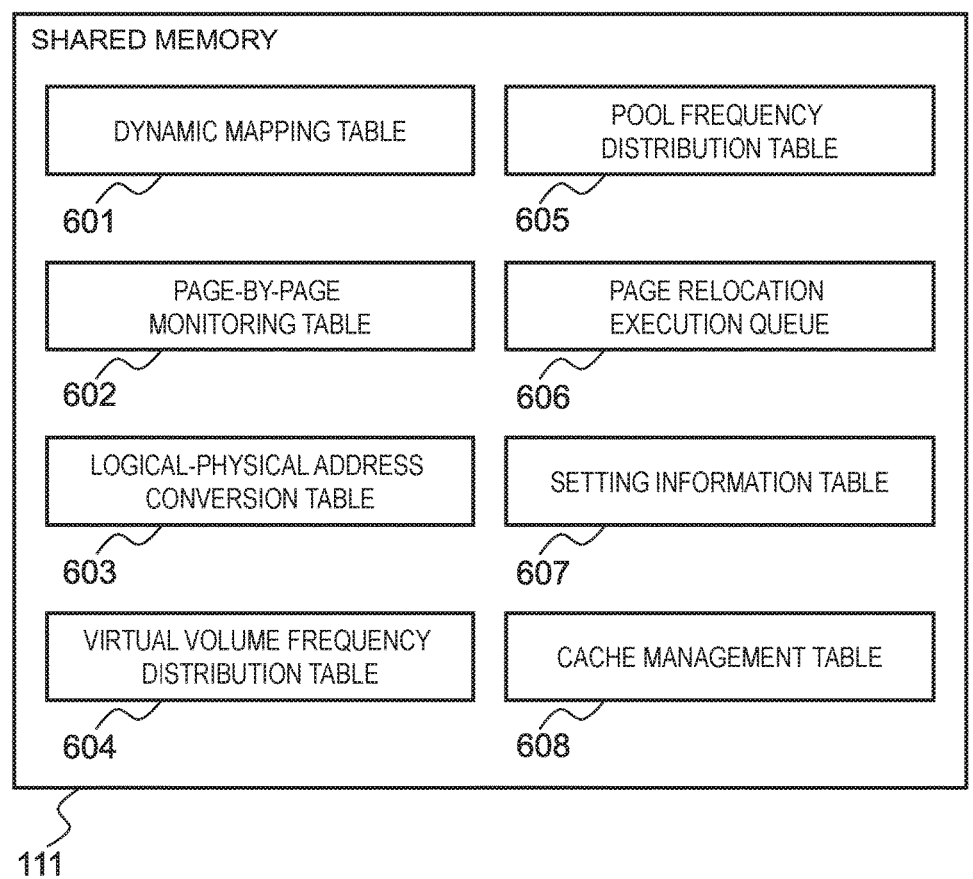
FIG. 6 is a diagram for illustrating tables placed in a shared memory.
Figure 7:
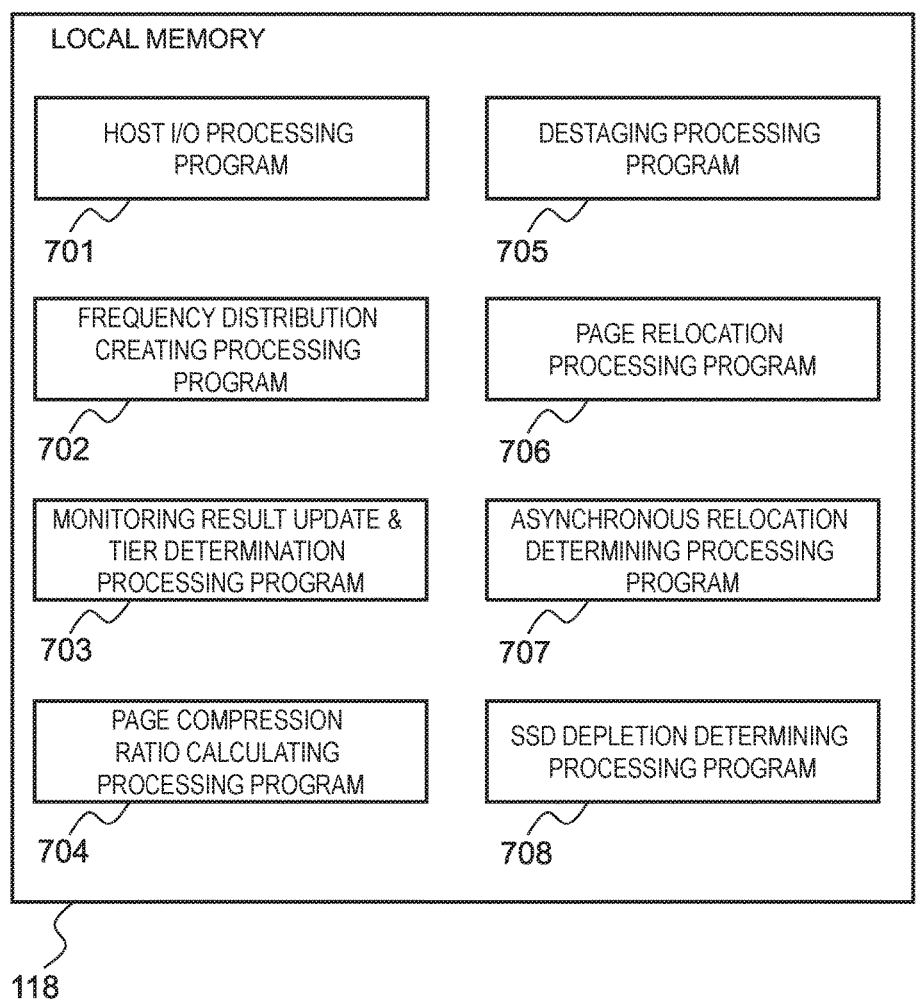
FIG. 7 is a diagram for illustrating programs stored in a local memory.

Tables placed in the shared memory 111 and programs stored in each local memory 118 are illustrated in FIG. 6 and FIG. 7, respectively. The locations of the tables and the programs are not limited to the places given as an example, and the tables and the programs may be stored in each local memory 118, the shared memory 111, the drive 113, and other places, or a space created between these and managed in tiers.

A dynamic mapping table 601 is used to manage, for each page in the virtual volumes 501, an association relation between an area allocated to the page from one of the pool volumes 503 and monitoring information of the page. A logical-physical address conversion table 603 is used to manage an association relation between a parity group (PG), a pool volume, and a physical disk address at which data of the pool volume is stored. A page-by-page monitoring table 602 is used to manage, for each page, monitoring information including the I/O count. A virtual volume frequency distribution table 604 is used to manage the distribution of page counts over different ranges of the load per capacity compression unit with respect to virtual volumes. A pool frequency distribution table 605 is used to manage the distribution of page counts over different ranges of the load per capacity compression unit with respect to pools. A page relocation execution queue 606 is a queue of pages waiting for the execution of page relocation. A setting information table 607 is used to manage various parameters set through a management I/F and other components. A cache management table 608 is used to manage the dirty/clean state of data that has been in the cache memory 110 when data is stored in the cache memory 110. When data to be written to a virtual volume is cached, the dirty/clean state is also managed in association with an address for identifying a page in the virtual volume 501 that is associated with the address of the cache memory 110.

Figure 16:
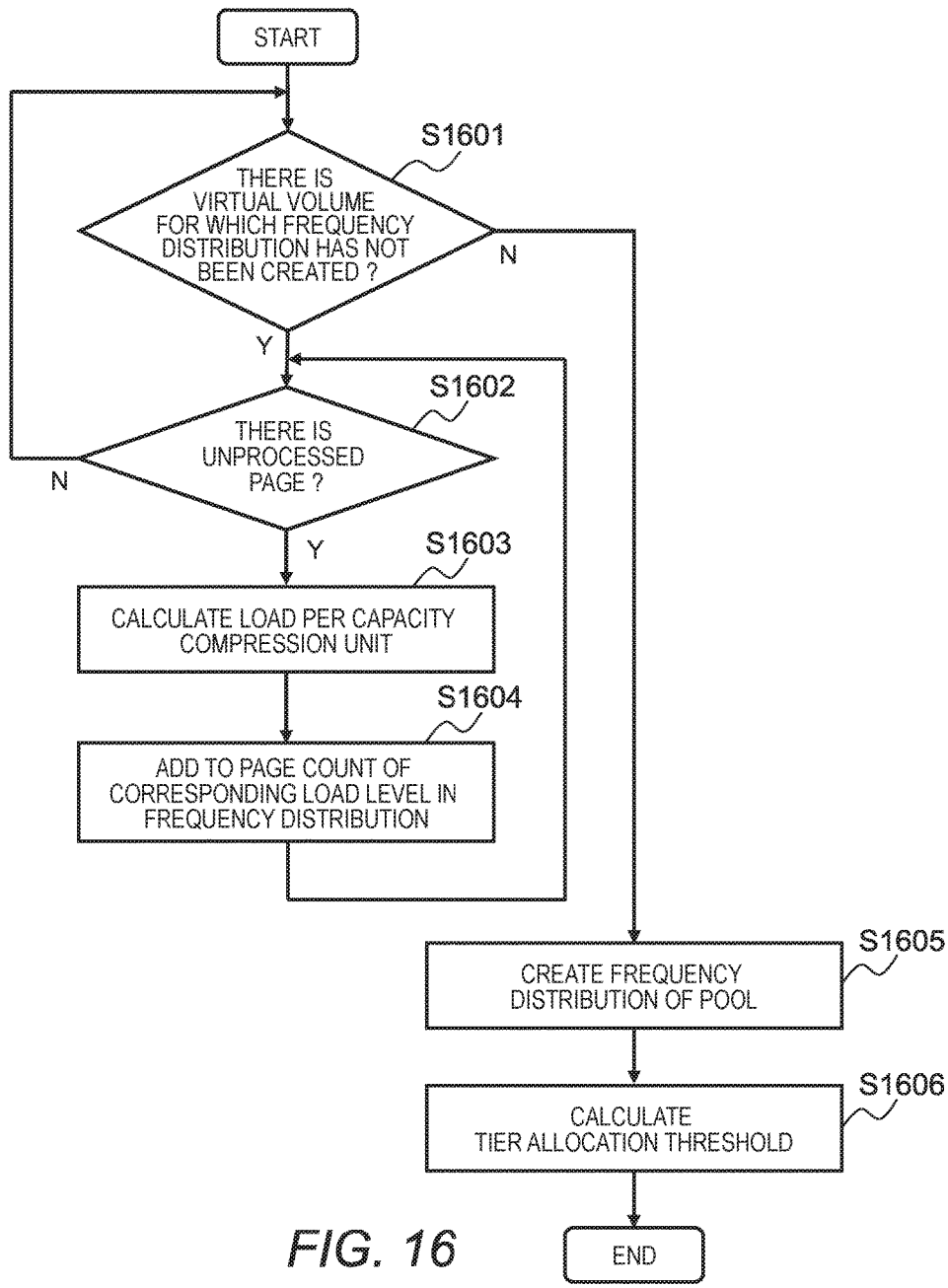
FIG. 16 is a flow chart of processing that is executed by a frequency distribution creating processing program.

The programs illustrated in FIG. 7 are executed by the processors 119. A host I/O processing program 701 processes read/write requests to the virtual volumes 501 in the case where I/O is received from the host 101. A frequency distribution creating processing program 702 calculates the tier allocation thresholds 508, and is to be executed in determined cycles (specifically, at an interval of the long cycle described above). A monitoring result update & tier determination processing program 703 executes an update of various types of information in the page-by-page monitoring table 602 and determination about inter-tier relocation of a page in sync with the host I/O processing program 701. This program determines whether or not promotion to Tier 1 or demotion from Tier 1 is necessary. A page compression ratio calculating processing program 704 calculates the compression ratio on a page-by-page basis, and is to be executed in determined cycles (specifically, a cycle shorter than the execution cycle of the frequency distribution creating processing program 702). A destaging processing program 705 stores, on a physical disk, cache memory data that has not been written to the physical disk, and is executed asynchronously with host I/O. A page relocation processing program 706 relocates a page, and is to be executed in the case where it is determined by the monitoring result update & tier determination processing program 703 and an asynchronous relocation determining processing program 707 that page relocation is necessary. The asynchronous relocation determining processing program 707 is activated in the case where the frequency distribution creation of FIG. 16 is finished, refers to the page-by-page monitoring table 602 in determined cycles, and determines, for each page, whether or not the page needs to be relocated to an appropriate tier. This program executes operations other than promotion to Tier 1. An SSD depletion determining processing program 708 determines whether the drive (SSD) 113 having a compression function is depleted, and is to be executed in determined cycles (specifically, a cycle shorter than the execution cycle of the frequency distribution creating processing program 702).

The page-by-page monitoring table 602 and the pool frequency distribution table 605 may be placed in the host 101 or the management server 102. In this case, the frequency distribution creating processing program 702 runs on the host 101 or the management server 102.

An example of the configuration of the dynamic mapping table 601 is illustrated in FIG. 8. Each single entry of the dynamic mapping table associates a page in a virtual volume with an area of a pool that is allocated to the page. A page in a virtual volume is identified by a virtual volume number 802 and a start virtual logical address 803 of the page in the virtual volume. Each area in a pool volume is identified by a pool number 801, a pool volume number 804, and a start pool logical address 805 of the area in the pool volume. Monitoring information is identified by a monitoring information index number 806. The monitoring information index number 806 corresponds to a monitoring information index number 1001 of the page-by-page monitoring table 602, but may be stored directly as an element of the dynamic mapping table 601. The dynamic mapping table 601 also holds, for each page, a compression ratio 807 of the page. The compression ratio is the ratio of the amount of compressed data to the amount of pre-compression data, and is updated cyclically by the page compression ratio calculating processing program 704. The compression ratio may be replaced with a reduction ratio. The reduction ratio is the ratio of a difference between a pre-compression data amount and a post-compression data amount to the pre-compression data amount.

The dynamic mapping table 601 is also used to manage a default value page in which determined initial value data (for example, 0 data) is stored. Taking capacity efficiency into account, a pool needs at least one default value page. Addresses of the default value page are stored as the pool volume number 804 and the pool logical address 805 that are associated with the virtual logical address 803 of the virtual volume number 802 in order to identify a virtual volume area to which data has never been written.

The dynamic mapping table 601 is also used to manage a pool volume number and a logical address for identifying a page in the pool 506 that is not yet allocated to a virtual volume. The pool volume number and logical address of the identified free page are associated with the virtual logical address 803 of the virtual volume number 802 at which data has never been written from the server, in the case where data is written to this virtual logical address 803 for the first time.

Though not shown, mapping information of the drive (SAS HDD) 114 is recorded in the dynamic mapping table 601 in addition to mapping information of the drive (SSD) 113. While data in the drive (SAS HDD) 114 is not actually compressed, an estimated compression ratio at which the data would be compressed if stored in the drive (SSD) 113 is recorded as the compression ratio 807 in the case of the drive (SAS HDD) 114. The estimated compression ratio that is recorded as the compression ratio 807 is obtained by the relevant processor 119 by performing trial compression on data (or a part thereof) that is stored in the drive (SAS HDD) 114. How large an amount data stored in the drive (SAS HDD) 114 would be if stored in the drive (SSD) 113 can thus be calculated. In addition, performing trial compression only on some data lightens the load on the processors 119, with the result that the I/O performance of the host computer is less affected.

Instead of trial compression, the following method may be used to record the compression ratio 807 of data stored in the drive (SAS HDD) 114. In the case where data that has never been stored in the drive (SSD) 113 is stored in the drive (SAS HDD) 114, "100%" is recorded as the compression ratio 807. In the case where data that has been stored in the drive (SSD) 113 is relocated and stored in the drive (SAS HDD) 114, a compression ratio at which the data has been compressed while being stored in the drive (SSD) 113 is recorded as it is.

With the compression ratio of data that is not compressed recorded in this manner, the compression ratio is known prior to promotion. The load per capacity compression unit can thus be calculated accurately and whether or not promotion is necessary is determined with precision, which improves the Tier 1-hitting ratio.

The configuration of the logical-physical address conversion table 603 is illustrated in FIG. 9. Each single entry of the logical-physical address conversion table indicates an association relation of one of the pool volumes 504 with the parity group (PG) number and an area of a physical drive (113 or 114) in which data of the pool volume is stored. The pool volume is identified by a pool volume number 901. Each PG includes a plurality of pool volumes defined therein. The PG associated with the pool volume is identified by a PG number 902. The physical drive area associated with the PG is identified by a physical drive number 903 and a physical start address 904 of the physical drive.

Pool volumes are the unit of addition to or reduction from a pool. This unit of addition may be PGs themselves instead of logical VOLs defined in a PG. In this case, the pool volume number 804 and pool logical address 805 stored in the dynamic mapping table may be used as an address in a PG.

The logical-physical address conversion table 603 also holds the state of the PG. The drive (SSD) 113 having a compression function configures parity groups based on the logical address space 400. However, the depleted state occurs on a parity group-by-parity group basis as well because, as described above, it is not guaranteed that the drive (SSD) 113 can write data to all areas of the logical address space 400. Whether the parity group is in a depleted state, a state in which a depletion threshold within the SSD is exceeded, or a normal state (non-depleted state) is held as a state 905.

The logical-physical address conversion table 603 further holds a reduced page count 906 and an addable page count 907. The reduced page count 906 is a value obtained by converting a data amount by which the depletion threshold is exceeded into the number of pages. In other words, the reduced page count 906 indicates the number of pages to be moved out of a PG of the drive (SSD) 113 that is in a depleted state in order to restore the PG to a normal state. The addable page count 907 is a value indicating how many new pages can be added to a PG (the PG here can be other types of PG than an SSD PG) that is in a normal state, i.e., a value obtained by page conversion in which a difference between the depletion threshold and the current consumed capacity is converted into a page count. The state 905, the reduced page count 906, and the addable page count 907 are used in the relocation of a PG of the drive (SSD) 113 that is in a depleted state. The SSD depletion determining processing program 708 updates the state 905, the reduced page count 905, and the addable page count 907 cyclically.

The configuration of the page-by-page monitoring table 602 is illustrated in FIG. 10. Each single entry of the page-by-page monitoring table 602 indicates monitoring information of a specific page 502 that is identified by a monitoring information index number 1001. An I/O count in a fixed cycle is stored as a long cycle I/O counter 1002. This cycle is the same as the cycle of operation of the frequency distribution creating processing program 702 described above, and the frequency distribution creating processing program 702 processes the I/O count of the fixed cycle. The I/O count of a page in this embodiment is the number of times the processors 119 have issued a read command or a write command to an address range in a drive that provides a physical area associated with the page.

The long cycle I/O counter 1002 in this embodiment includes a plurality of counters, i.e., a long cycle I/O counter (Side A) 1002A and a long cycle I/O counter (Side B) 1002B. One of the counters is used as a counter for monitoring result collection by the host I/O processing program 701 and the destaging processing program 705, and the other is used as a counter for the frequency distribution creating processing program 702, the monitoring result update & tier determination processing program 703, and the asynchronous relocation determining processing program 707. By changing between the counters, monitoring result collection and processing of relocating a page to a tier that is determined with the use of established monitoring data of a previous cycle can be executed in parallel to each other.

A temporary counter 1003 is used to measure short cycle I/O, and indicates how many I/Os have been counted between a time indicated by a last temporary counter completion time 1004 and the current time. When the temporary counter 1003 finishes counting to N (=temporary counter completion value), the last temporary counter completion time 1004 is updated with the current time and the temporary counter is reset to 0. Setting the temporary counter 1003 to 0 triggers IOPS measurement of a cycle that differs from the long cycle and that is calculated by (last temporary counter completion time 1004−current time)/N. By counting I/Os in the manner described above, a short cycle load can be measured without depending on a determined cycle that is set in order to set tier thresholds.

In other words, the short cycle IOPS is higher when N I/Os are reached in a shorter period of time. A load per capacity compression unit (long cycle) 1005 is a load calculated from the long cycle I/O counter 1002, and the compression ratio 807 of the dynamic mapping table 601. Specifically, the load per capacity compression unit is calculated by dividing the long cycle I/O counter 1002 by the compression ratio 807. Identifying a page that is heavy in load and high in compression ratio in order to improve the data hit ratio of upper tiers is thus accomplished. The load per capacity compression unit (long cycle) 1005 is updated in the cycle of execution of the frequency distribution creating processing program 702. A load per capacity compression unit (short cycle) is not held in the table and is instead calculated from a short cycle IOPS that is calculated by the expression given above and from the compression ratio 807, at the time of tier determination synchronous with I/O, which is described later.

The temporary counter 1003 may be configured so that only a counter for an information amount that represents a differential count N is placed in a local memory that is short in access latency and small in capacity, while the last temporary counter completion time alone is placed in a shared memory that is large in capacity. This way, access to the shared memory, which is generally long in access latency, is reduced to one time for N I/Os, and the influence of increased processing by the processor on I/O processing can be lessened without consuming a large portion of local memory capacity to store the temporary counter completion time.

In the page-by-page monitoring table 602, a read/write ratio (or a read amount/write amount) or a sequential ratio (or an average I/O length, or a common method of determining sequentiality (in which I/O continuity or the like is determined)) may be managed to be used in the tier determination. For example, a page high in write ratio is a cache hit in the cache memory, and it is therefore desirable to give priority to a page high in read ratio over a page high in write ratio when placing a page in Tier 1. In the case where Tier 1 is an SSD, pages high in read ratio may be placed preferentially in Tier 1 for the purpose of maintaining the SSD's life.

The page-by-page monitoring table 602 may hold the count of a moving average counter to use, as the count of a long cycle counter, a value calculated from a moving average (exponential moving average, simple moving average, or the like) of a plurality of cycles. The technology of US 2012/0246386 A is thus combined with this embodiment, thereby efficiently avoiding unnecessary demotion due to, for example, a cyclic drop in load on weekends.

The configuration of the pool frequency distribution table 605 and the virtual volume frequency distribution table 604 are illustrated in FIG. 11. The pool frequency distribution table 605 is used to manage the distribution of page counts over different loads per capacity compression unit with respect to each pool 506 (a pool number 1101). Each single entry of the pool frequency distribution table 605 relates to one pool and indicates ranges of loads per capacity compression unit of the pool and the numbers of pages included in the load ranges. Load levels 1102 are the degrees of load organized into levels. A parenthesized value of each load level 1102 indicates a start value of load values defined for the level. An end value of the load level range is (a start value of load values of the next entry−1). A page count 1103 corresponds to the number of pages included in the range of the load level 1102. The tier allocation thresholds 508 are also managed in this table. The tier allocation thresholds 508 can take any value equal to or larger than 0, and do not always need to be a border value between load ranges. The tier allocation thresholds 508 can also take load levels as their values.

The virtual volume frequency distribution table 604 is used to manage the distribution of page counts over different loads per capacity compression unit with respect to each virtual volume 501 (a virtual volume number 1104). Each single entry of the virtual volume frequency distribution table 604 relates to one virtual volume and indicates a load per capacity compression unit 1105 (namely, a load range) and a page count 1106, which is the number of pages included in the load range. The table structure of the virtual volume frequency distribution table 604 is the same as that of the pool frequency distribution table 605.

Figure 12:
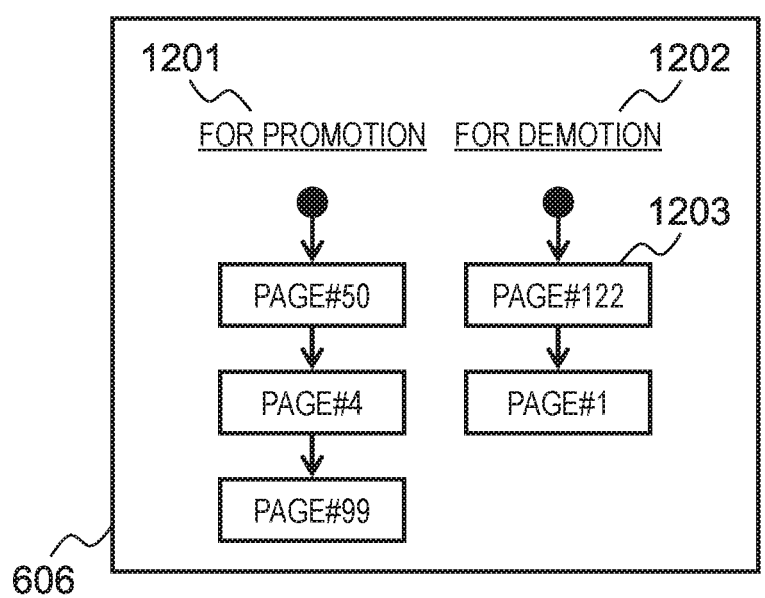
FIG. 12 is a diagram for illustrating a configuration of a page relocation execution queue.

The configuration of the page relocation execution queue 606 is illustrated in FIG. 12. The page relocation execution queue 606 is classified into a promotion queue 1201 and a demotion queue 1202. The queues 1201 and 1202 may be provided for each storage system, or for each pool or PG, or for each pool volume.

In the case where it is determined as a result of tier determination using various thresholds that a page needs to be moved, the monitoring result update & tier determination processing program 703 or the asynchronous relocation determining processing program 707 enqueues an entry 1203 into one of the queues 1201 and 1202 that suits the movement pattern (promotion or demotion). The entry 1203 includes a reference to a movement destination page (corresponds to the pool volume number 804 and the pool logical address 805) and a reference to a movement source page (corresponds to the pool volume number 804 and the pool logical address 805). The included references are references to information of the dynamic mapping table 601 and the page-by-page monitoring table 602.

The page relocation processing program 706 executes page relocation (processing of copying data from the movement source physical page to the movement destination physical page and rearranging references in pool volume pages (physical pages) that are associated with virtual volume pages (virtual pages)) based on the entry 1203 enqueued in the queue. While the maximum performance of relocation in a usual environment varies depending on the amount of drive-side load that is incurred by host I/O, use of the queue accomplishes stable relocation despite an environment where the maximum performance of relocation varies.

Figure 13:
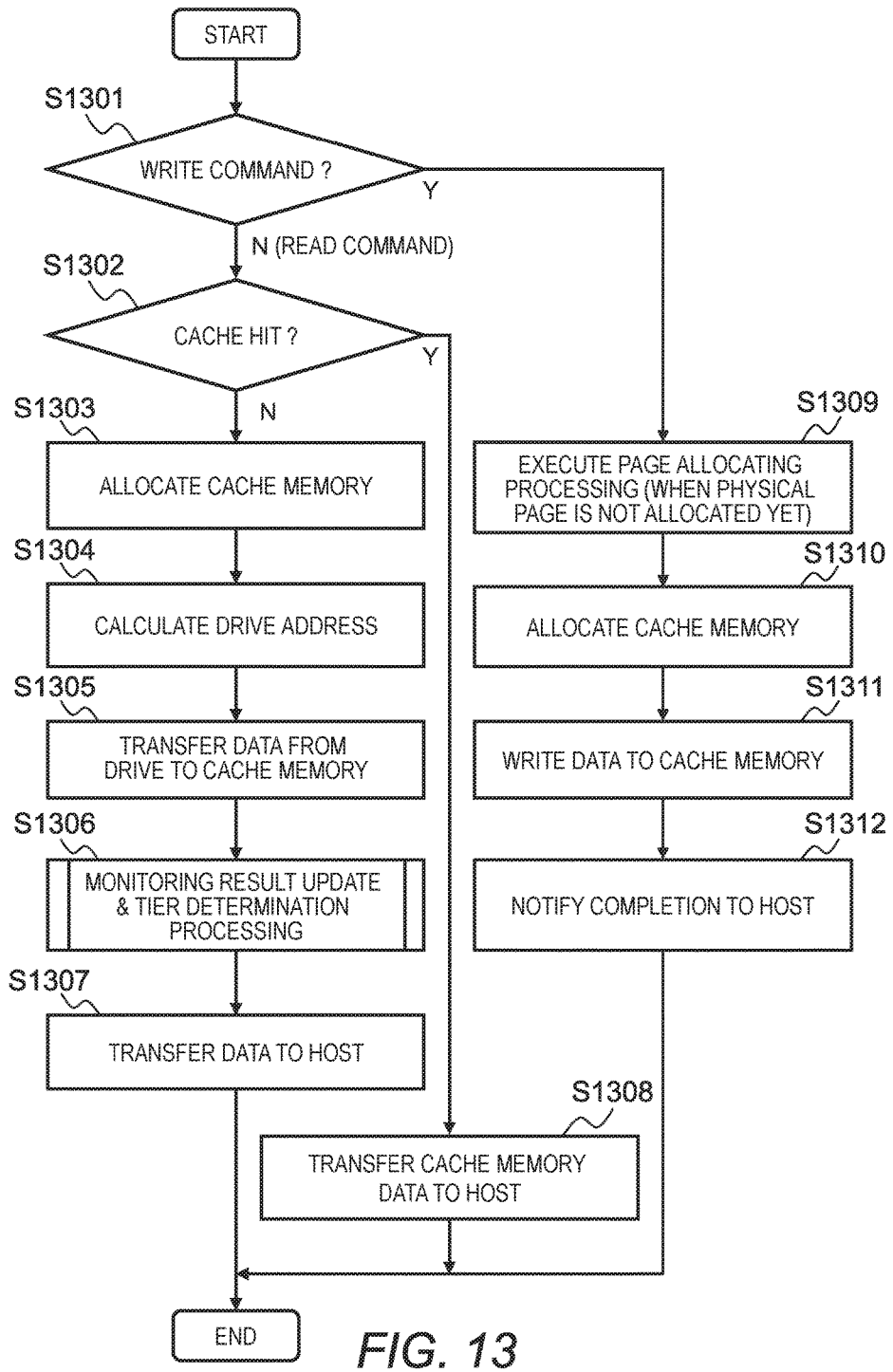
FIG. 13 is a flow chart of processing of reading/writing data in a virtual volume.

FIG. 13 is a flow chart for processing of reading/writing data in one of the virtual volumes 501. In the case where the storage system 104 receives an I/O processing request from the host 101, the host I/O processing program 701 is run to execute this flow.

The host I/O processing program 701 determines whether the received request is a request to read data out of the virtual volume 501 or to write data to the virtual volume 501 (S1301). In the case where the I/O processing request is a write request, whether a physical page is already allocated to a virtual page specified by the request is determined by referring to the dynamic mapping table 601. An unused page is allocated from a pool in the case where no physical page has been allocated to the virtual page (S1309). While a physical page of any tier can be allocated to the virtual page that is to store the write data in Step S1309, a physical page of Tier 1, namely, the drive (SSD) 113, is allocated in this embodiment. The data to be stored in the drive (SSD) 113 is compressed by the compression/decompression circuit 218 before being stored in a physical extent.

There are unused pages in areas of parity groups, which are configured based on the logical address space 400 of the drive (SSD) 113 having a compression function, even in a parity group that is in a depleted state, for example (particularly when the compression ratio is poor). Because data cannot be stored in a parity group that is in a depleted state, page allocation is not to be executed in spite of the existence of unused pages. Whether or not page allocation is feasible is therefore determined by managing the number of unused pages that can be allocated based on free capacity within the drive (SSD) 113. A specific method thereof is described in US 2012/0317333 A1, and details of the method are omitted here.

The host I/O processing program 701 checks whether or not an area associated with an address in a virtual volume that is specified by the I/O processing request is allocated in the cache memory 110 and, in the case where the area has not been allocated, allocates the area in the cache memory 110 (S1310). Next, a response to the effect that the write data can be transferred is sent to the host 101, the write data transferred from the host 101 is written to the allocated cache memory area, and a dirty flag in the cache management table 608 is set to on for the cache memory area to indicate that data in the cache memory area is not written to a disk yet (S1311). The dirty flag is information indicating that data in the cache memory is not written to a disk, and is held in the cache management table 608, which is used to manage cache memory areas. A response for notifying the completion of write I/O processing is sent to the host 101 (S1312), at which point the I/O processing program is ended.

In the case where it is determined in Step S1301 that the I/O processing request is a read request, on the other hand, the host I/O processing program 701 checks whether or not data associated with an address in a virtual volume that is specified by the I/O processing request is found in the cache memory (a cache hit) (S1302). In the case of a cache hit, the data found in the cache memory is transferred to the host 101 (S1308). After every piece of data requested by the host 101 is transferred to the host 101, a read processing completion response is sent to the host 101, and the I/O processing program is then ended.

In the case of a cache miss in Step S1302, an area is allocated in the cache memory to store data associated with an address in a virtual volume to which the read request is issued (S1303). Next, the dynamic mapping table 601 is used to check whether or not one of the pages 502 is allocated from a pool to the virtual volume address to which the read request made by the host is issued. In the case where no page 502 is allocated, the dynamic mapping table 601 is used to calculate an address in a drive of the default value storing page (S1304), and the stored default values are transferred from the drive to the allocated cache memory area (S1305).

In the case where one of the pages 502 is allocated to the virtual volume address to which the read request is issued, the pool volume number and logical address of the allocated page are obtained with the use of the dynamic mapping table 601, and the physical drive number and physical start address of the allocated page are further obtained with the use of the logical-physical address conversion table 603 (S1304). Next, data is transferred from the obtained drive address to the allocated cache memory area (S1305).

At the time the data is transferred to the cache memory, the pieces of information stored in the page-by-page monitoring table 602 that is associated with the relevant monitoring information index number 806 in the dynamic mapping table 601 are updated, and tier determination processing is executed (S1306). The data stored in the cache memory from the drive is subsequently transmitted to the host (S1307). After every piece of data requested by the host 101 is transferred to the host 101, a read processing completion response is sent to the host 101, and the I/O processing program is then ended.

Figure 14:
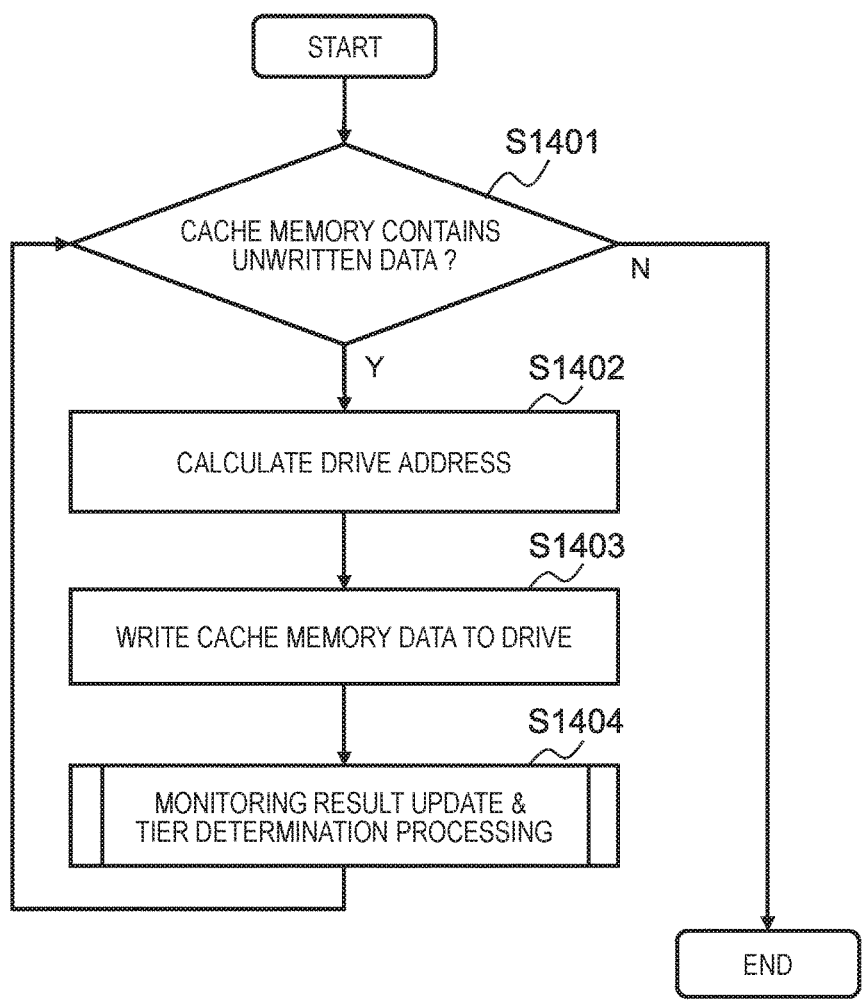
FIG. 14 is a flow chart of processing that is executed by a destaging processing program.

FIG. 14 is a flow chart of processing that is executed by the destaging processing program 705. As described with reference to FIG. 13, the host I/O processing program 701 sets the dirty flag to on after writing write data from the host 101 to the cache memory in response to a data write request made by the host 101.

Whether or not there is a cache area for which the dirty flag is set to on (unwritten data) in Step S1311 is checked cyclically by referring to the cache management table 608 (S1401). In the case where a cache area whose dirty flag is on is found, a virtual volume number and a logical address in the cache management table 608 that are associated with the cache area are used to obtain the pool volume number 804 and pool logical address 805 of the allocated page from the dynamic mapping table 601.

In the case where the obtained pool volume number 804 and pool logical address 805 indicate the address of the default value page, the dynamic mapping table 601 is referred to in order to allocate a new free page to which new data is to be written. The pool volume number and pool logical address of the newly allocated page are then stored in the dynamic mapping table 601 in association with the virtual volume number 802 and virtual logical address 803 of the area that is being processed by the destaging processing. The physical start address 904 of the relevant physical drive is obtained from the logical-physical address conversion table 603 (S1402) after the pool volume number 804 and pool logical address 805 have been obtained. The dirty data in the cache memory is written at the drive address obtained in Step S1402 (S1403). At this point, the dirty flag of this data is set to "off", thereby indicating that the data is clean.

In an entry of the page-by-page monitoring table 602 that is associated with the relevant monitoring information index number of the dynamic mapping table 601, the I/O counter values (the long cycle I/O counters 1002 and the temporary counter 1003) are updated, and tier determination processing is executed (S1404). Whether there is another piece of dirty data in the cache memory is checked (S1401). The processing is ended in the case where unwritten data is not found, and Step S1402 and subsequent steps are executed in the case where there is unwritten data.

Figure 15:
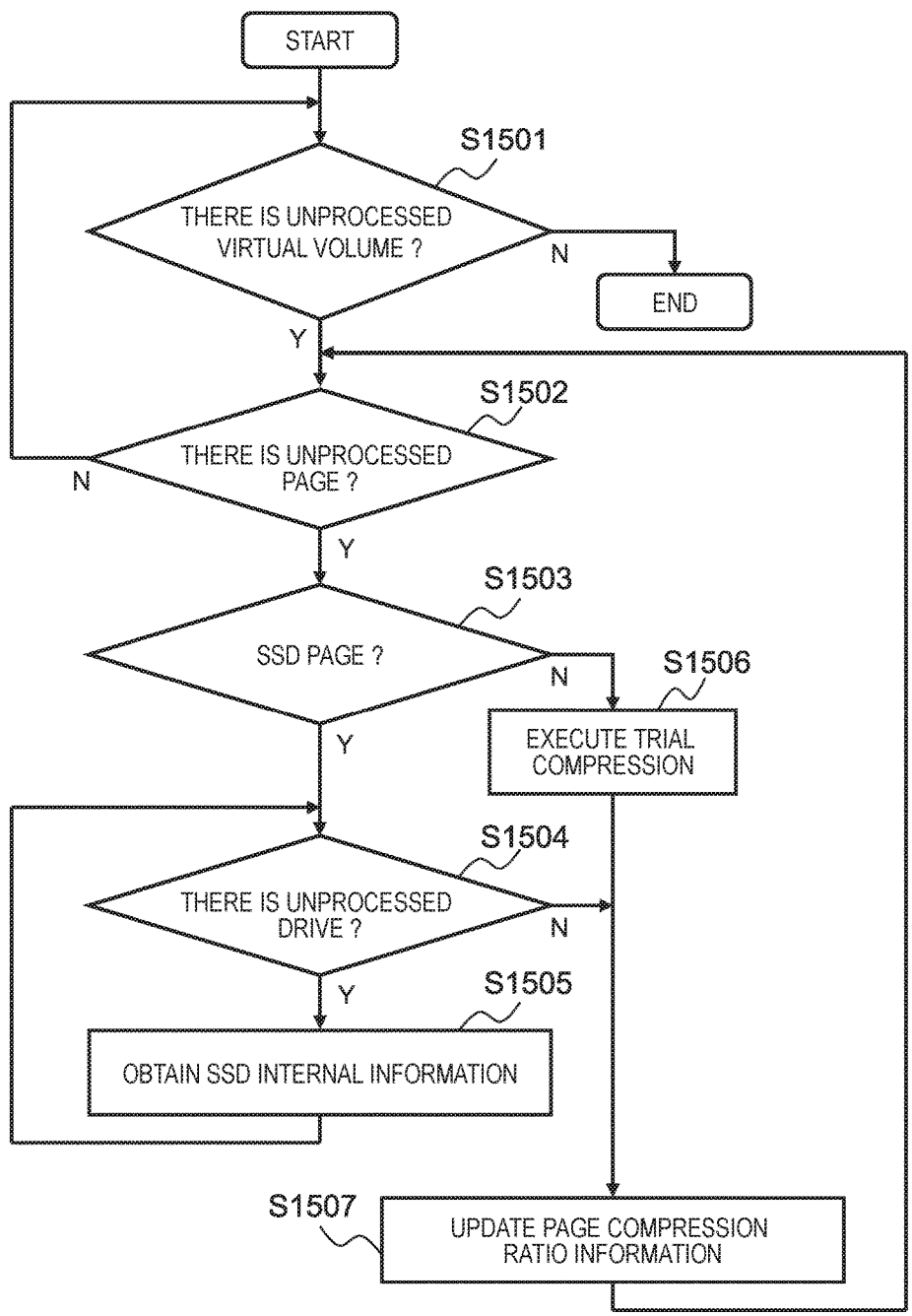
FIG. 15 is a flow chart of processing that is executed by a page compression ratio calculating processing program.

FIG. 15 is a flow chart of processing that is executed by the page compression ratio calculating processing program 704. The page compression ratio calculating processing program 704 is executed at timing different from the arrival of an I/O request from the host 101, in other words, executed in the background, and calculates, for each virtual volume separately, the compression ratio of a page allocated to the virtual volume. First, whether or not there is a virtual volume that has not been processed is checked (S1501). In the case where an unprocessed virtual volume is found, whether or not the virtual volume has an unprocessed page for which the compression ratio has not been calculated is checked, starting from the head page of the virtual volume (S1502). In the case where an unprocessed page is found, whether or not the unprocessed page is a page allocated from a parity group that is created from the drive (SSD) 113 is determined by tracing relevant information through the dynamic mapping table 601 and the logical-physical address conversion table 603. The drive type can be identified from the physical drive number 903.

in the case where the unprocessed page belongs to drives other than the drive (SSD) 113, trial compression is performed on a part (for example, the first several kilobytes) of data stored in the page (S1506), and the compression ratio 807 in the dynamic mapping table 601 is updated with a compression ratio obtained by the trial compression (S1507). The trial compression of Step S1506 is a function added at discretion, and may not be included in the page compression ratio calculating processing program 704.

In Step S1507, the compression ratio 807 in the dynamic mapping table 601 may be updated with a compression ratio of 100% (meaning that data is uncompressed) because data stored in drives other than the drive (SSD) 113 is not compressed.

In the case where it is determined in Step S1503 that the unprocessed page is a page allocated from a parity group that is created from the drive (SSD) 113, an inquiry about the compression ratio is issued to the every drive (SSD) 113 that provides a physical address area to the unprocessed page. Specifically, whether or not there is an unprocessed drive is checked (S1504). In the case where an unprocessed drive is found, an internal information obtaining command is issued to the drive (SSD) 113 and the compression ratio is obtained therefrom (S1505). To obtain the compression ratio from the drive (SSD) 113, one of the processors 119 of the storage system 104 specifies an address range starting from the physical start address 904 as a physical area that is associated with the unprocessed page, and the processor 213 of the drive (SSD) 113 calculates the compression ratio from the logical-physical conversion table 460 held in the drive (SSD) 113 and from other pieces of information. After the compression ratio is obtained from every drive that provides a physical address area to the unprocessed page, the obtained compression ratio is converted into a page-by-page compression ratio, with which the compression ratio 807 in the dynamic mapping table 601 is updated (S1506). The conversion to a page-by-page compression ratio is necessary because the value of the obtained compression ratio varies from one drive to another. However, an average of the obtained compression ratios or the poorest or lowest value of the obtained compression ratios may be used instead. Alternatively, compression ratios may be obtained from only specified drives instead of every drive in Step S1504 in order to lighten the processing load, and the thus obtained compression ratios may be used as the compression ratio of the unprocessed page. In the case where the difference in compression ratio is small between pieces of data stored in a plurality of drives from which the page is created, compression ratios of only some of the drives can be used as the compression ratio of the unprocessed page, thereby lessening the load on the processors 119.

Figure 29:
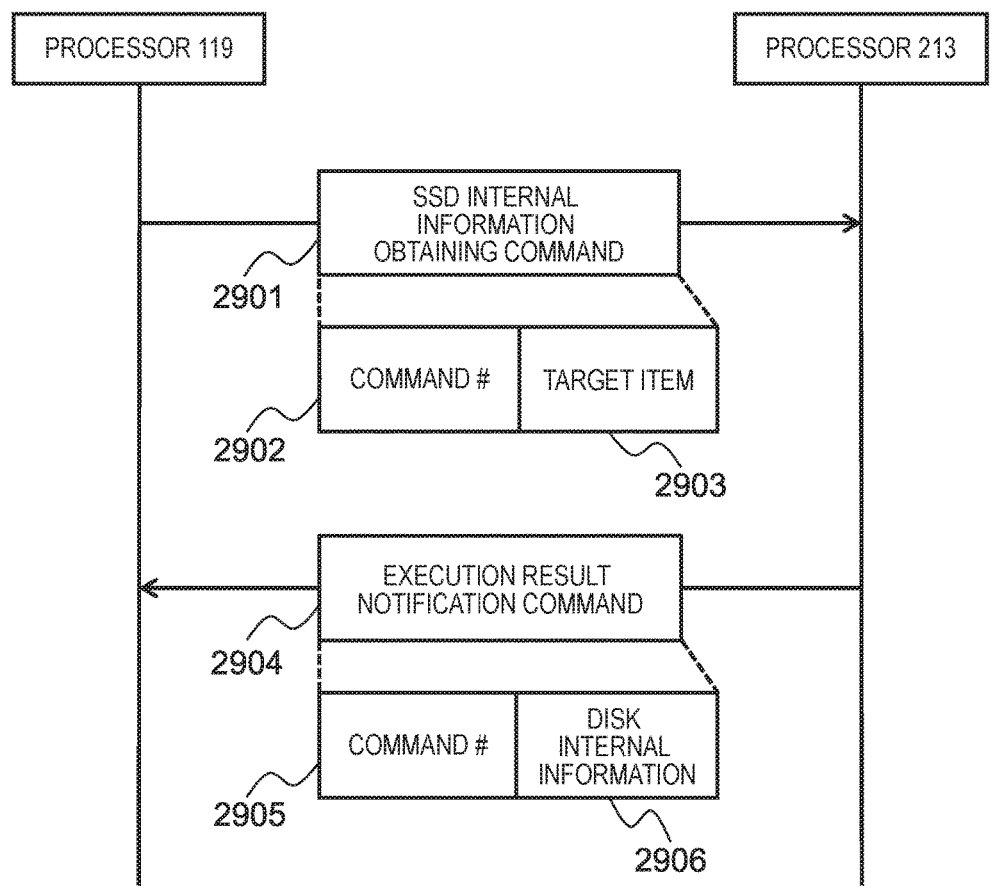
FIG. 29 is a sequence diagram for illustrating details of obtaining SSD internal information.

FIG. 29 is a sequence diagram for illustrating details of obtaining SSD internal information (S1505) in FIG. 15. An SSD internal information obtaining command 2901 is a command transmitted by the processors 119 of the storage system 104 to the drive (SSD) 113. The SSD internal information obtaining command 2901 includes, for example, a command #2902 and a target item 2903. The command #2902 is the identifier of the command (a command #). The target item 2903 is an item specified by the processor 119 of the storage system 104 as an item to be obtained from the drive (SSD) 113. Specifically, information managed inside the drive (SSD) 113 is specified as the target item 2903. The information specified in this embodiment is information that indicates "the compression ratio of a range in the logical address space 400 of the drive (SSD) 113".

An execution result notification command 2904 is a command sent by the drive (SSD) 113 to the processor 119 of the storage system 104, and includes information that is a response to the SSD internal information obtaining command 2901. The execution result notification command 2904 includes, for example, a command #2905 and disk internal information 2906. The command #2905 indicates to which command this command 2904 is sent in response, and the command #2902 of the request command is stored as the command #2905. The disk internal information 2906 is a value that is a response to the specification of the target item 2903. The response value is calculated by the drive (SSD) 113 or copied from a table inside the drive (SSD) 113.

FIG. 16 is a flow chart of processing that is executed by the frequency distribution creating processing program 702. The frequency distribution creating processing program 702 checks whether or not there is a virtual volume for which a frequency distribution is not created yet (S1601). In the case where a virtual volume for which a frequency distribution has not been created is found, whether or not the virtual volume contains an unprocessed page is checked, starting from the head of the virtual volume, in order to create a frequency distribution (S1602). In the case where an unprocessed page is found, the load per capacity compression unit of the unprocessed page is calculated with the use of long cycle IOPS that is calculated from the long cycle I/O counter 1002 of the page-by-page monitoring table 602 and the compression ratio 807 of the dynamic mapping table 601. The calculated load value is stored as the load per capacity compression unit 1005 in the page-by-page monitoring table 602 (S1603). For example, in FIG. 10, the load per capacity compression unit 1005 of the monitoring index number #1 is 1,000 IO (Side A)/80%=1,250, and the load per capacity compression unit 1005 of the monitoring index number #2 is heavier at 650 IO (Side A)/50%=1300.

The page count of a load level in the frequency distribution that corresponds to the calculated load is added next (S1604). The long cycle IOPS can be calculated by, for example, dividing the value of the long cycle I/O counter 1002 on the side where monitoring results are collected in the immediately preceding cycle by the length of the cycle (seconds). It is therefore desirable to set an equal length for both the IOPS collection cycle and the cycle of execution of this frequency distribution creating processing. The moving average may be calculated as the long cycle IOPS as described with reference to FIG. 10.

In Step S1602, in the case where the check reaches the end of the virtual volume that is being processed, or in the case where no unprocessed page is found in the virtual volume, the frequency distribution creating processing returns to Step S1601 in order to check for another virtual volume that fits the criterion. The frequency distribution of a pool is created next (S1605). The pool frequency distribution is calculated by adding up the frequency distributions of virtual volumes. Specifically, in entries of the virtual volume frequency distribution table 604 that have the virtual volume numbers 1104 of virtual volumes belonging to a subject pool, the sum of the page counts 1106 is calculated for each load value 1105, and is stored as the page count 1103 of each load level 1102 in the pool frequency distribution table 605.

The tier allocation thresholds 508 are subsequently determined by calculation (S1606). The tier allocation thresholds 508 can be calculated by determining, for each tier, the maximum allocated page amount range 510 from a limit point where the load per capacity compression unit exceeds the potential (the maximum number of I/Os that can be processed) of the tier, or the consumed size after compression exceeds the capacity of the tier, and by using intersecting points where the ranges 510 intersect with the frequency distribution graph 509 in the calculation of the tier allocation thresholds 508. Alternatively, thresholds specified by a user through a management terminal or the like may be used as the tier allocation thresholds 508.

Figure 17:
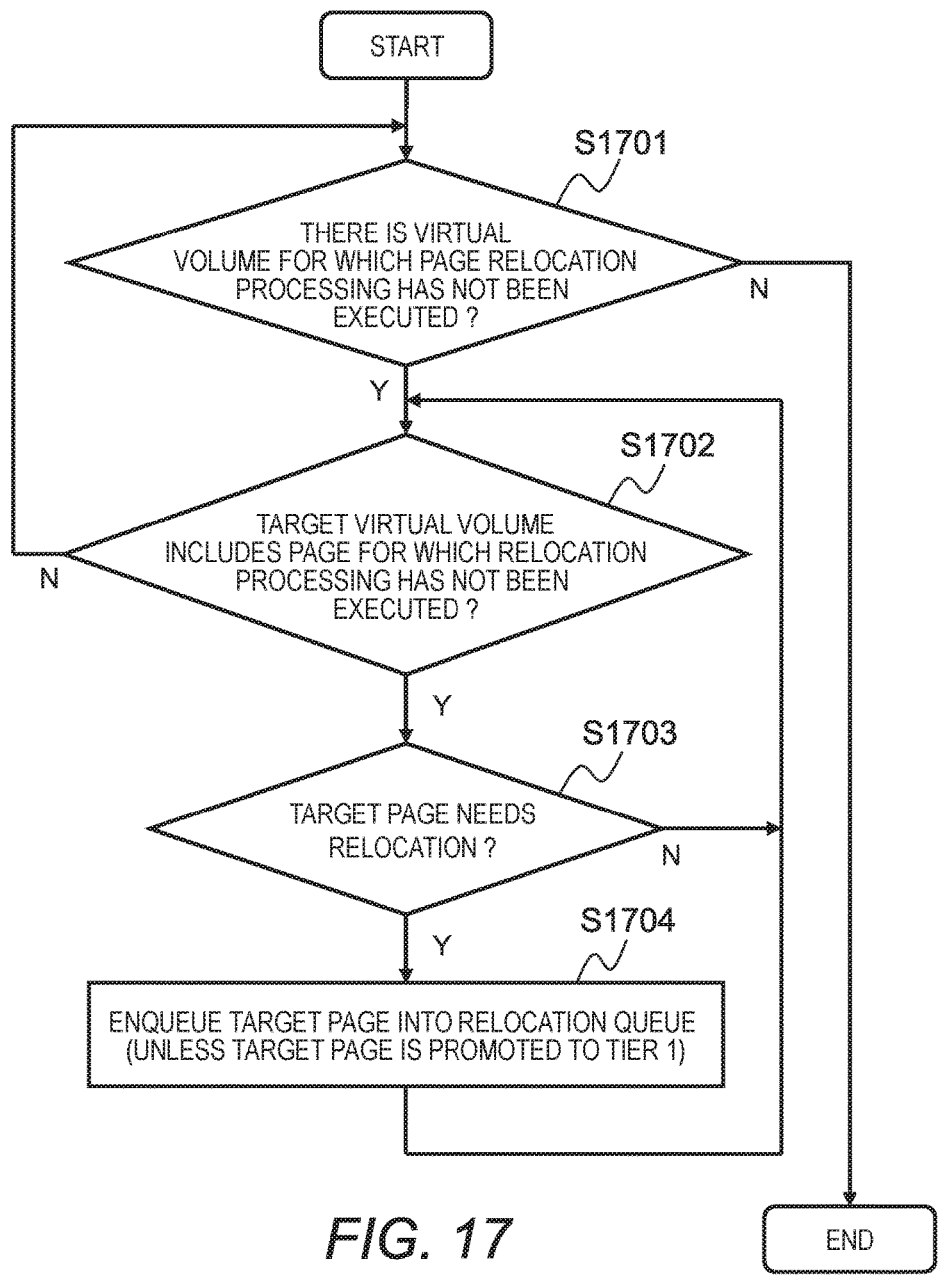
FIG. 17 is a flow chart of processing that is executed by a asynchronous relocation determining processing program.

FIG. 17 is a flow chart of processing that is executed by the asynchronous relocation determining processing program 707. The asynchronous relocation determining processing program 707 first checks whether or not there is a virtual volume for which page relocation processing is not executed yet (S1701). In the case where a virtual volume for which page relocation processing has not been executed is found, each allocated page of the unprocessed virtual volume is checked for the necessity/non-necessity of relocation, sequentially from the head to the end of the virtual volume (S1702 and S1703). Checking the necessity/non-necessity of relocation means determining whether a subject page can remain in the current tier or needs to be moved to a different tier from the load per capacity compression unit based on the long cycle IOPS of the page, the load per capacity compression unit based on the short cycle IOPS of the page, and the tier allocation thresholds 508 of the relevant pool that are recorded in the pool frequency distribution table 605. For example, the load per capacity compression unit 1005 calculated by the frequency distribution creating processing program 702 is compared with the tier allocation threshold 508A between Tier 1 and Tier 2 and the tier allocation threshold 508B between Tier 2 and Tier 3.

In the case where the load per compression capacity unit of the subject page is less than the tier allocation threshold 508A and more than the tier allocation threshold 508B, and the current tier of the page is Tier 1, the page is to be demoted to Tier 2 and therefore is determined as needing relocation. However, as described above, in the case where the page is relocated due to the short cycle IOPS becoming higher, that is, in the case where the page has been promoted to Tier 1 as a result of the determination made in the monitoring result update & tier determination processing that the page needs to be moved, and the page is not low in the value of the load per capacity compression unit based on short cycle IOPS (in the case where the load value is larger than the tier allocation threshold 508A by a determined amount or more), the page may be determined as not needing relocation. In the case where the current tier of the subject page is Tier 2, the page, being already placed in Tier 2, does not need relocation. To which tier the subject page belongs can be determined from the relation between the virtual logical address 803 of the virtual volume number 802 and the pool volume number 804 in the dynamic mapping table 601.

In the case where relocation is necessary, the subject page is enqueued into the page relocation execution queue 606 for relocation (S1704). In the case where relocation is unnecessary, after the subject page is relocated, whether or not the next page in the unprocessed virtual volume is to be relocated is checked (S1702 and S1703). After the relocation processing is finished for all pages of the unprocessed virtual volume, another virtual volume for which the relocation processing has not been executed is checked, and this is repeated until page relocation is finished for all virtual volumes (S1701). In the case of cyclic processing, the asynchronous relocation determining processing program 707 may be shut down once at the end of the cyclic processing to continue the page relocation necessity determining processing anew in the next round of the cyclic processing. In the case where the page relocation necessity determining processing is finished before the end of a cycle is reached, the asynchronous relocation determining processing program 707 may be shut down once at that point to execute the page relocation determining processing anew for each virtual volume in the next cycle.

Figure 18:
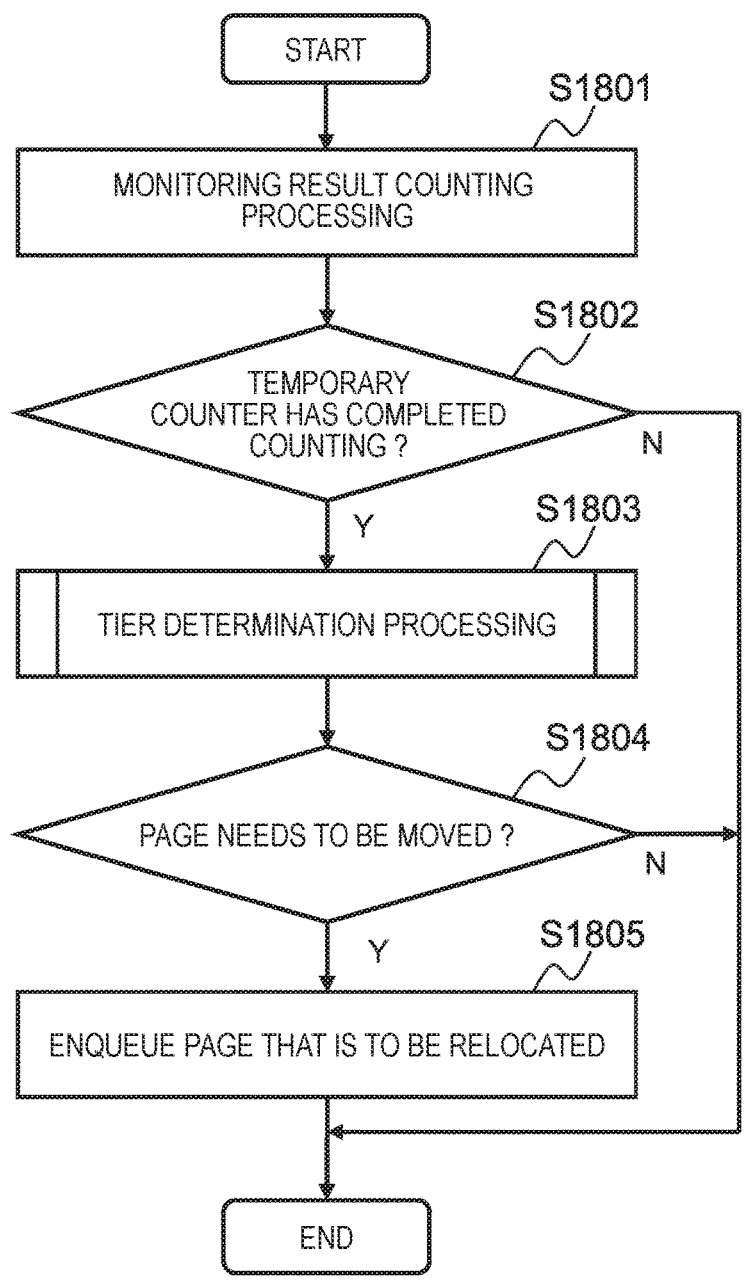
FIG. 18 is a flow chart of a monitoring result update & tier determination processing.

FIG. 18 is a flow chart of the monitoring result update & tier determination processing. This processing is executed synchronously with a read command in Step S1306 issued by the host I/O processing program 701 in the case of data read, and is executed asynchronously with a write command in Step S1404 issued by the destaging processing program 705 in the case of data write. Monitoring result collection may be executed at the time a command is issued to a drive, and also at the time the host I/O is received so that cache hit data is included in the monitoring. Tier determination processing in this invention is executed at the time monitoring results are updated as described below.

In the case where this processing is started, monitoring result counting processing is executed first (S1801). Specifically, in an entry of the page-by-page monitoring table 602 that is for the subject page, the long cycle I/O counter 1002 on the side where monitoring results are collected in the current cycle is counted and the temporary counter 1003 is counted. In the case of the first I/O, the current time is stored as the last temporary counter completion time. In the case where the value of the temporary counter 1003 after the monitoring result counting is N, short cycle IOPS is calculated by (current time−last temporary counter completion time)/N. The monitoring result update & tier determination processing then proceeds to the tier determination processing (S1803). In the case where the value of the temporary counter is less than N, the monitoring result update & tier determination processing is ended. In the case where (current time−last temporary counter completion time) in the short cycle IOPS calculation method described above exceeds a determined cycle, the calculated length of time is not a short cycle with respect to the determined cycle. The counting may therefore be stopped in the case where (current time−last temporary counter completion time) is equal to or more than a determined length of time.

The tier determination processing (S1803) uses various thresholds (the tier allocation thresholds 508, a promotion threshold (PT), and a demotion threshold (DT)) to determine a tier. Details of the tier determination processing are described later with reference to FIG. 19, FIG. 20, and FIG. 21. In the case where it is determined as a result of the tier determination processing (S1803) that the page needs to be moved ("Y" in Step S1804), the page to be relocated is enqueued into the page relocation execution queue 606 (S1805), and then the processing of FIG. 18 is ended. In the case where the page does not need to be moved ("N" in Step S1804), the processing of FIG. 18 is ended at that point.

Figure 19:
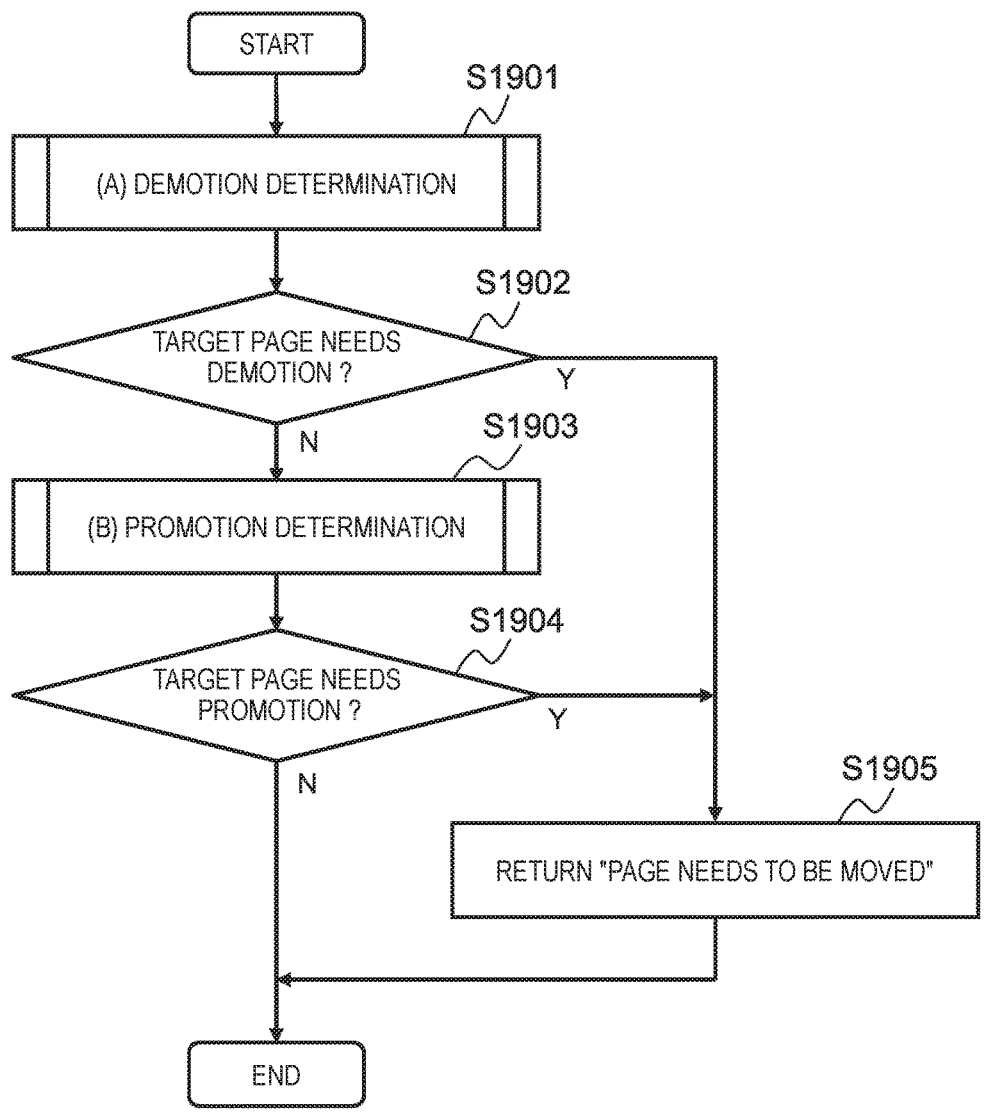
FIG. 19 is a flow chart of a tier determination processing.

FIG. 19 is a flow chart of the tier determination processing that is executed in Step S1803 of FIG. 18.

When the tier determination processing is started, (A) demotion determination is executed first (S1901). The demotion determination is processing of determining whether or not the subject page is to be demoted. Details of the demotion determination are described with reference to FIG. 20. In the case where it is determined as a result of the demotion determination that demotion is necessary ("Y" in Step S1902), a message "the page needs to be moved" is returned (S1905), and the tier determination processing is ended. In the case where it is determined that demotion is unnecessary ("N" in Step S1902), (B) promotion determination is executed (S1903). The promotion determination is processing of determining whether or not the subject page is to be promoted. Details of the promotion determination are described with reference to FIG. 21. In the case where it is determined as a result of the promotion determination that promotion is necessary ("Y" in Step S1904), a message "the page needs to be moved" is returned (S1905), and the tier determination processing is ended. In the case where it is determined that promotion is unnecessary ("N" in Step S1904), the tier determination processing is ended (the page does not need to be moved). Demotion is executed prior to promotion in order to allocate a free storage capacity of Tier 1 as described above.

Figure 20:
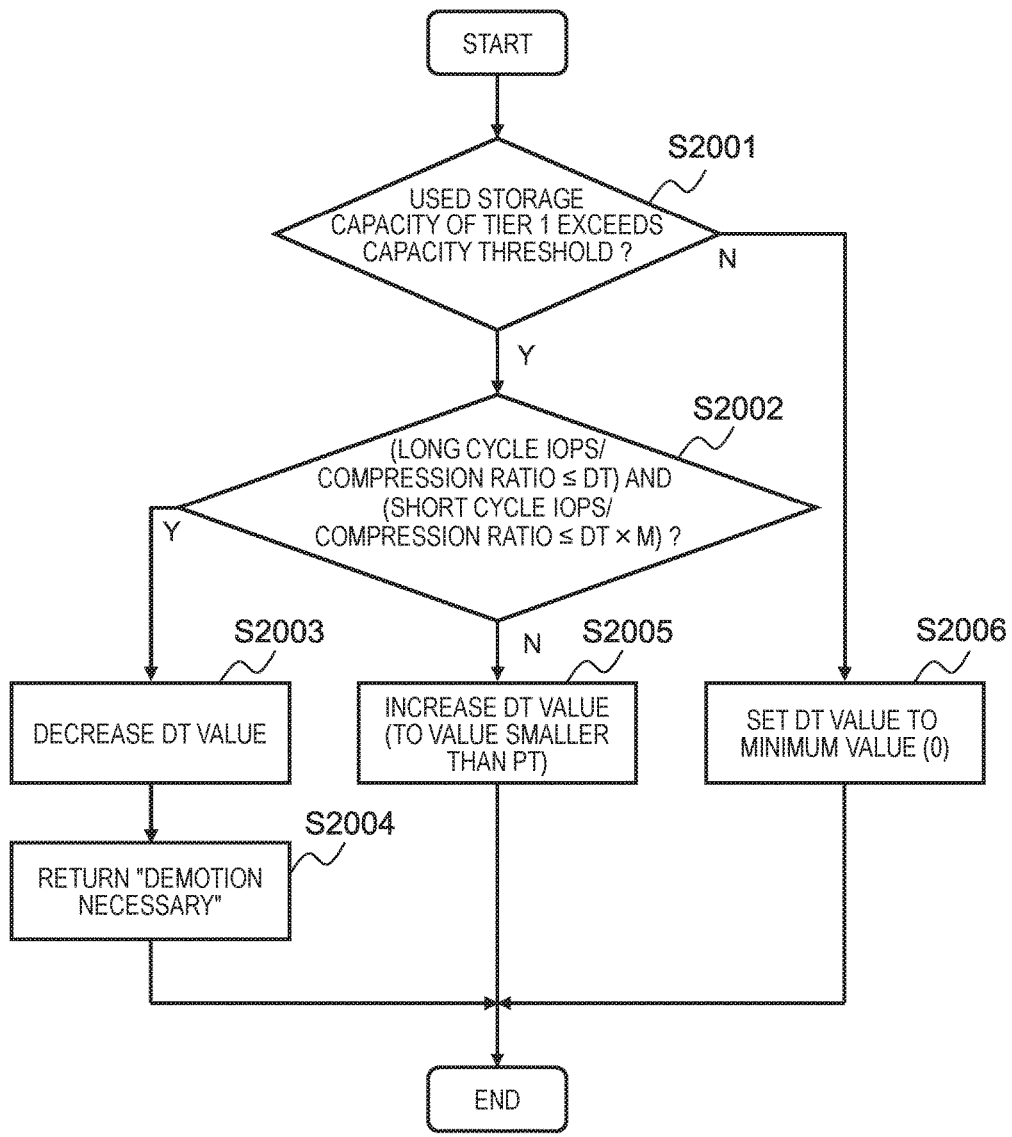
FIG. 20 is a flow chart of a demotion determination processing.

FIG. 20 is a flow chart of the demotion determination processing. First, whether or not the used storage capacity of Tier 1 is higher than a determined value is determined (S2001). This step is not indispensable. However, by inserting this determination, demotion is executed if necessary in order to allocate a free storage capacity of Tier 1, and allocating a free capacity in Tier 1 in advance reduces the time required for sudden promotion. In the case where the used storage capacity does not exceed the threshold ("N" in Step S2001), the processing is ended. Before the processing is ended, the demotion threshold (DT) may be reset to the minimum value (S2006).

The demotion threshold is for determining whether or not a page placed in Tier 1 is to be demoted to a lower tier. A value equal to or larger than the tier allocation threshold 508A (T) is set as the demotion threshold. This is because even a page that is equal to or greater than the tier allocation threshold 508A in terms of load per capacity compression unit based on the long cycle IOPS and that is determined by the asynchronous relocation determining processing program 707 as a page to be placed in Tier 1 needs to be demoted from Tier 1 in order to promote a page that has a heavy load per capacity compression unit based on the short cycle IOPS in the monitoring result update & tier determination processing program 703, which is called from the host I/O processing program 701 or of the destaging processing program 705. A page in which the load per capacity compression based on the long cycle IOPS is equal to or less than the demotion threshold is therefore demoted.

The minimum value of the demotion threshold (DT) is, for example, the tier allocation threshold 508A (T). Other than the used capacity, whether the performance utilization rate of Tier 1 exceeds a determined value may be used as a condition for determining whether to proceed to Step S2002. When the performance utilization rate is high, the response of Tier 1 is poor, and demoting some data of Tier 1 shifts the load to other tiers.

In the case where the used storage capacity exceeds the threshold ("Y" in Step S2001), the tier determination is executed for the page with the use of the demotion threshold (DT) (S2002). Specifically, a message "demotion necessary" is returned (S2004) and the processing is ended in the case where the load per capacity compression unit based on the long cycle IOPS (calculated by long cycle IOPS/compression ratio) is equal to or less than DT and the load per capacity compression unit based on the short cycle IOPS (calculated by short cycle IOPS/compression ratio) is equal to or less than DT×M ("Y" in Step S2002).

A value already calculated by the frequency distribution creating processing program 702 and stored as the load per capacity compression unit (long cycle) 1005 in the page-by-page monitoring table 602 can be used as the load per capacity compression unit based on the long cycle IOPS. The load per capacity compression unit based on the short cycle IOPS, on the other hand, needs to be calculated in this tier determination processing because the short cycle IOPS is determined when the monitoring result update & tier determination processing program 703 is executed. A value that is larger than 1 and that is stored in the setting information table 607 is used as "M". The purpose of the value of M is to make an adjustment so that more inputs/outputs per second (IOPS) are required in the short cycle than in the long cycle. That is, the short cycle IOPS is low in the degree of certainty about whether the load remains heavy, and the number of times page relocation is executed based on the short cycle IOPS tends to be high. Taking this into account, relocation based on the short cycle IOPS is controlled by multiplying DT by M and thus setting a high threshold for the load based on the short cycle IOPS. The value of M may be adjusted dynamically to optimize the Tier 1-hitting ratio, by using the Tier 1-hitting ratio or the like as an evaluation function and using a commonly known method such as feedback control.

The value of DT may be decreased (S2003) next, though this step is not indispensable. In the case where the DT value is expressed in levels, this step is accomplished by lowering the level by a fixed amount. In the case where the DT value is a load per capacity compression unit based on IOPS, this step may be accomplished by multiplying DT by a value smaller than 1 (a fixed value) or by subtracting a fixed amount from DT. With the threshold lowered, only pages that are even lower in IOPS and are included as pages of Tier 1 are to be demoted in the next flow.

In the case where the determination is "N" in Step S2002, the value of DT is increased (S2005) (to a value that does not exceed the promotion threshold (PT) described later. This is because, if DT exceeds PT, the IOPS of a page to be demoted becomes greater than the IOPS of a page to be promoted, and the amount of IO to Tier 1 decreases). The processing is then ended.

In the manner described above, the value of DT is decreased in the case where there is a capacity shortage in Tier 1 and Tier 1 has a page to be demoted, and the value of DT is increased in the case where there is a capacity shortage in Tier 1 and Tier 1 does not have a page to be demoted. This configuration enables the storage system 104 to dynamically control the demotion threshold (DT) and set a page that is as low in I/O count as possible as a page to be moved out, in order to allocate a free capacity for storing a page to be promoted by executing an appropriate demotion as possible (appropriate demotion means demotion of pages that are low in IOPS).

In the case where the drive load, the number of pages that are being relocated, or the like is at a determined level or higher, it may be determined prior to Step S2003 that moving a page is inexecutable. The processing may be ended in this case instead of skipping forward to Step S2004. Pages can thus be relocated by taking into consideration the amount of page data that can be moved per unit time which varies depending on the drive load at the time.

The demotion threshold (DT) may be set for each parity group separately. In the case where Tier 1 is an SSD, a step may be added to determine whether the concentration of write due to host I/O is making it difficult to maintain the standard life of the SSD. A step of demoting pages that are heavy in write load is provided in the case where maintaining the life is difficult. Pages are desirably demoted on a PG-by-PG basis in this step.

Figure 21:
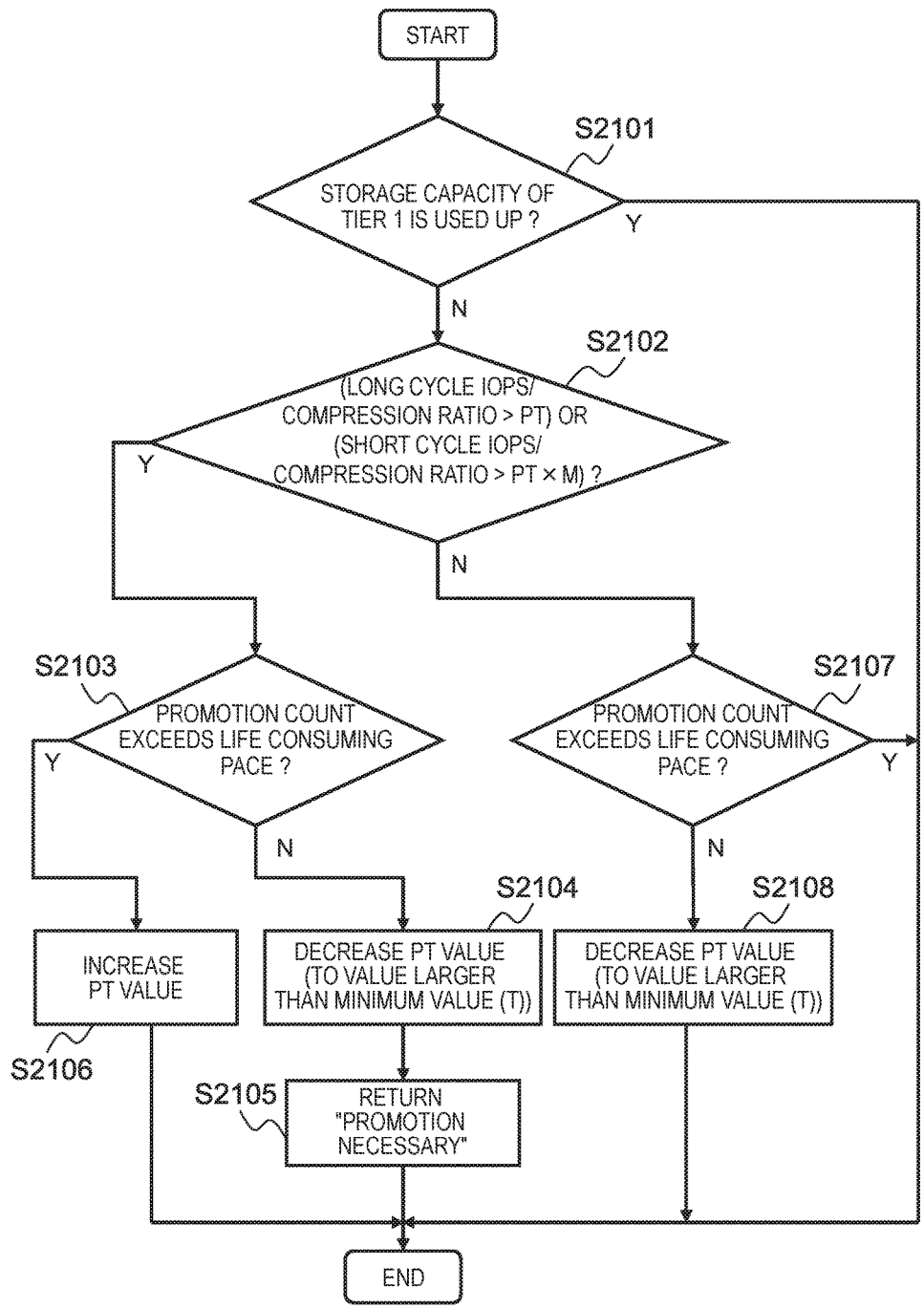
FIG. 21 is a flow chart of a promotion determination processing.
Figure 30:
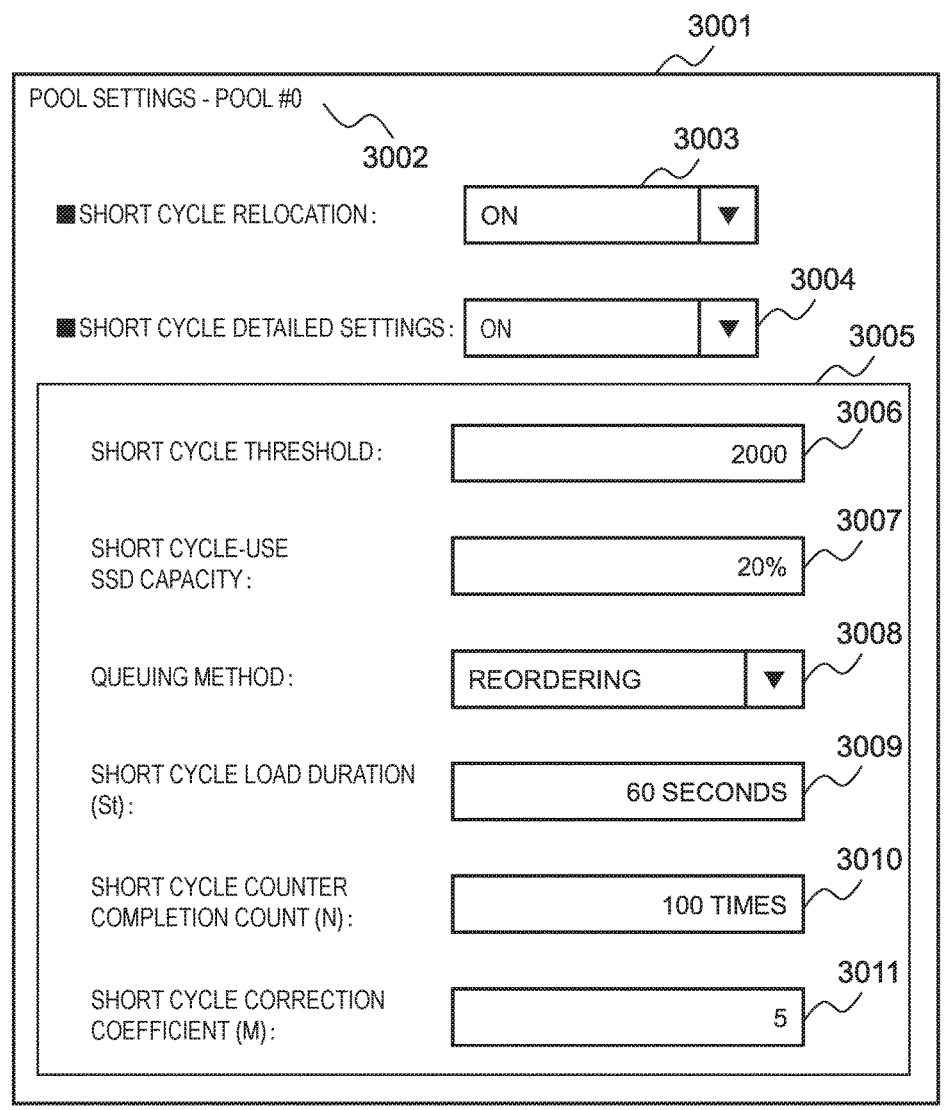
FIG. 30 is a diagram for illustrating an example of a screen for setting parameters on a pool-by-pool basis.

FIG. 21 is a flow chart of the promotion determination processing. In the promotion determination processing, the promotion threshold (PT) is dynamically controlled (PT is increased or decreased) so that pages heavy in the load per capacity compression unit based on the short cycle IOPS are promoted under certain constraints (NF life and movement throughput). The initial value of PT can be, for example, the tier allocation threshold 508A (T). A short cycle threshold 3006 in FIG. 30 is PT.

In the case where the storage capacity used in Tier 1 is used up ("Y" in Step S2101), a page cannot be moved to Tier 1 and the processing is therefore ended. In the case where the storage capacity used in Tier 1 is not used up ("N" in Step S2101), whether the load per capacity compression unit based on the long cycle IOPS (calculated by long cycle IOPS/compression ratio) exceeds PT, or whether the load per capacity compression unit based on the short cycle IOPS (calculated by short cycle IOPS/compression ratio) exceeds PT×M, is determined. As in the demotion determination processing of FIG. 20, a value already calculated by the frequency distribution creating processing program 702 and stored as the load per capacity compression unit (long cycle) 1005 in the page-by-page monitoring table 602 can be used as the load per capacity compression unit based on the long cycle IOPS. The load per capacity compression unit based on the short cycle IOPS, on the other hand, needs to be calculated in this tier determination processing because the short cycle IOPS is determined when the monitoring result update & tier determination processing program 703 is executed. The purpose and configuration of "M" in FIG. 21 are the same as those described with reference to FIG. 20. However, a value different from M for demotion may be set to M for promotion.

In the case where the determination is "Y" in Step S2102, a message "promotion necessary" is returned (S2105), and the processing is then ended. In the case where the determination is "N" in Step S2102, the processing is ended at that point. As illustrated in the flow chart, whether the promotion count exceeds a life consuming pace may be determined (S2103 and S2107) in the case where Tier 1 is an SSD (in particular, an MLC having a low limit to deletion count) or other similar cases.

Figure 31:
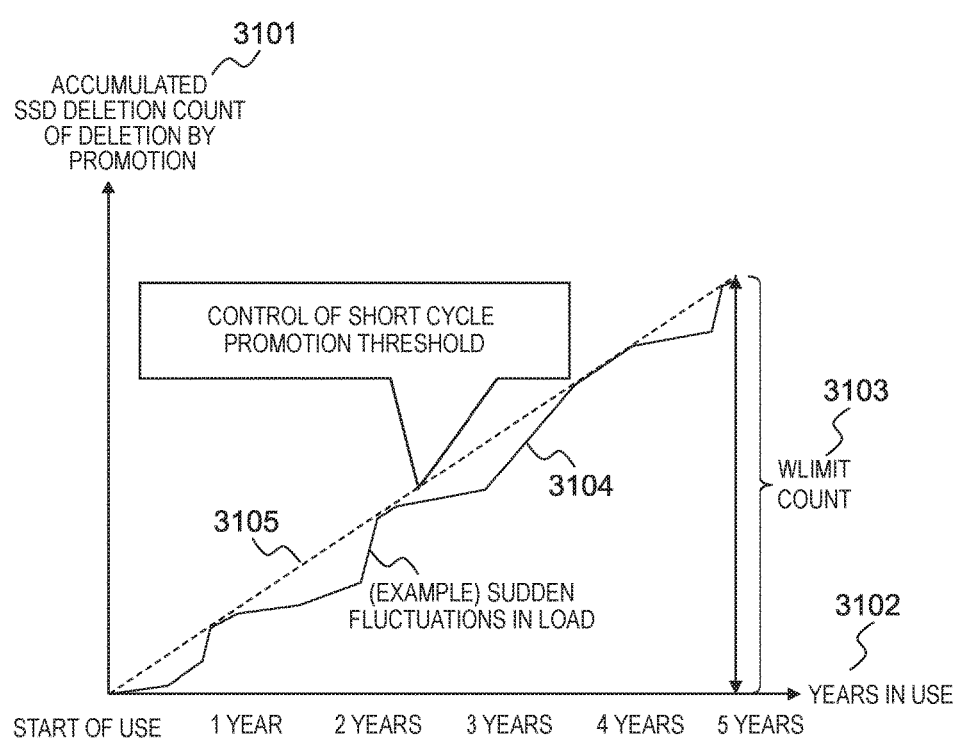
FIG. 31 is a diagram for illustrating a method for maintaining life of the SSD.

The concept of promotion speed adjustment for maintaining the life of the SSD is illustrated by the graph of FIG. 31. SSDs have a limit to the number of times data can be written, and frequent data write shortens the life of SSDs. Executing the promotion processing, which involves data write to the SSD, too frequently therefore shortens the life of the SSD (demotion, which involves only data read out of the SSD, basically does not have this problem). An axis of ordinate 3101 of the graph represents the accumulated number of times data is deleted from the SSD due to promotion. An axis of abscissa 3102 represents the passage of years over which the storage system is in use. A Wlimit count 3103 indicates the maximum limit number of times data is deleted from the SSD due to promotion. The Wlimit count 3103 can be set to, for example, approximately a determined percent of the limit deletion count of the SSD (the limit deletion count of a general single-level cell (SLC) SDD is approximately one hundred thousand times, and the limit deletion count of a general multi-level cell (MLC) SDD is approximately ten thousand times). For instance, the life of many storage products is set to approximately five years. An example of transitions of the promotion-related deletion count is illustrated by a graph 3104. A graph 3105 represents an objective value of the accumulated promotion-related deletion count that is plotted against years of use. When a sudden increase in I/O causes a heavy load, the amount of data moved by promotion increases. Threshold control is therefore performed in this embodiment by increasing the promotion threshold (PT) so that the deletion count 3104 does not exceed the pace of the graph 3105. With this configuration, pages to be moved are narrowed down efficiently (pages to be moved are limited to pages having even higher IOPS), and the life of the SSD can be extended by keeping the promotion-related SSD deletion count within a determined range while maintaining the hit ratio of the SSD. In the case where no sudden load is caused, the amount of page data moved is small and the resultant extra leeway till the limit deletion count is reached can be held over. This promotion threshold (PT) adjustment is efficient when executed parity group by parity group. However, the PT adjustment may also be executed pool by pool or storage system by storage system.

The control described above can be implemented by, for example, a method in which the storage system holds information about the accumulated promotion count and the number of years of use (Uy) for each parity group. The accumulated promotion-related SSD PG deletion count is calculated from the accumulated promotion count by, for example, the following expression.

Accumulated promotion-related SSD PG deletion count ($Wc$)=(promotion count of promotion executed in PG×page size/SSD PG capacity)× correction coefficient*

* The correction coefficient is determined based on the RAID level or on the characteristics of the SSD (the page size in the SSD, write amplification, or the like).

The thus calculated Wc is used to execute pace determination by, for example, the following expression (Step S2103 or S2107).

($W$limit count/years of use of the target (e.g., five years))≥($Wc/Uy$)

In the case where this expression is true, it can be determined that executing promotion causes no problem in maintaining the life consuming pace. In the case where this expression is false, it can be determined that executing promotion causes the promotion speed to exceed the life consuming pace. Necessary information (the accumulated promotion count and the number of years of use), or information for estimating the necessary information (the amount of writable data, the life ratio, the page size, the write amplification efficiency, and the like), may be obtained from the SSD with the use of a command as illustrated in FIG. 29, or may be held in the local memories 118 or the shared memory 111.

The life consuming pace determination may be changed dynamically depending on the capacity utilization ratio of the SSD. For example, the SSD is low in capacity utilization ratio and is accordingly low in hit ratio in an early stage of operation of the system. However, this state (a state in which a lot of pages need to be moved) is often temporary and limited to a period in the early stage of the system, and therefore allowing the promotion speed to temporarily exceed the life consuming pace is efficient in some cases. Specifically, in the case where the capacity utilization ratio of the SSD is a determined value or less, the write amount is temporarily allowed to increase (until the capacity utilization ratio of the SSD becomes the determined value) by omitting the determination of Step S2103 and executing promotion for every page that is to be promoted, and the overall write amount is cut down in a later phase, thereby accomplishing improvement in overall performance. The acceleration of page movement may be adjusted in stages so that the objective pace is reached in stages.

The value of PT is increased in the case where the promotion count exceeds the life consuming pace (S2106), and is decreased in the case where the life consuming pace is not exceeded (S2104 or S2108) (however, PT is not set to a value equal to or smaller than the tier allocation threshold 508A (T)). In the case where the PT value is expressed in levels, this step may be accomplished by lowering the level by a fixed amount. In the case where the PT value is a load per capacity compression unit based on IOPS, this step may be accomplished by multiplying PT by a value smaller than 1 (a fixed value) or by subtracting a fixed amount from PT. In the manner described above, pages high in I/O count can be set as pages to be moved while keeping an appropriate pace to reach the limited number of times of deletion by promotion (the Wlimit count).

The PT value may be increased in the case where the page relocation execution queue 606 is full or in the case where the drive load is heavy, and may be decreased in the opposite case. Through this processing, pages that are as heavy in load per capacity compression unit as possible can be set as pages to be moved while achieving balance with the limited amount of page data that can be moved per unit time.

The promotion threshold (PT) may be set for each parity group. By holding PT for each parity group separately, the life can be determined parity group by parity group, which means that the reduction in the amount of page data to be moved can be minimized. Alternatively, the read/write ratio, the sequential ratio, and the like may be obtained for each page in order to exclude a page in which the write amount is equal to or more than a determined value (the write ratio is high and/or the sequential ratio is high) from promotion.

While the life consuming pace determination in the embodiment described above is executed with respect to data write due to promotion, data write due to host I/O may also be included in the life determination. For example, in the case of an I/O pattern in which the amount of data written due to host I/O is small, the amount of data to be promoted can be increased relatively and the Tier 1-hitting ratio is improved even more.

The PT value may be equal to the DT value.

FIG. 22 is a flow chart of processing that is executed by the page relocation processing program 706. This processing is for executing relocation on a page-by-page basis, and is run in a multiplex manner throughout the system. This processing is executed at the time the entry 1203 is dequeued from the page relocation execution queue 606. When the entry 1203 is dequeued, this processing is executed by using, as inputs, the identifier of the relevant virtual page 502, the identifier of the movement source physical page, and the identifier of the movement destination physical page that are included in the entry described with reference to FIG. 12. First, the cache management table is referred to in order to determine whether or not an area indicated by the virtual page identifier is found in the cache (S2201). The processing proceeds to Step S2204 in the case where the cache includes an area indicated by the virtual page identifier. In the case where it is determined in Step S2201 that an area indicated by the virtual page identifier is not found in the cache, on the other hand, a cache memory area is allocated, the cache management table is updated (S2202), and staging processing is executed for the target data (S2203). Data of the movement source physical page is staged into the cache memory in this step.

Page mapping is then changed (S2204). Specifically, the change is executed by updating the identifier of a physical page that is associated with the virtual page in the dynamic mapping table 601 to the identifier of the movement destination physical page. The movement source physical page becomes an unused page at this point. The dirty bit is then updated to on for a subject cache area in the cache management table (S2205), and the processing is ended. By setting the dirty bit to "on", the destaging processing program 705 destages the data to the movement destination physical page asynchronously.

Even in the case where Tier 1 is created from the drive (SSD) 113 having a compression function and the page relocation processing program 706 demotes data to Tier 2 created from the drive (SAS HDD) 114, which does not have a compression function, the compression ratio of the data that is held in the dynamic mapping table 601 is to be kept as it is instead of being updated. Under the assumption that, while compressed data is decompressed when placed in a lower tier, the data is compressed at substantially the same compression ratio as the last time when promoted back to Tier 1, the load per capacity compression unit can be calculated with higher precision.

Figure 23:
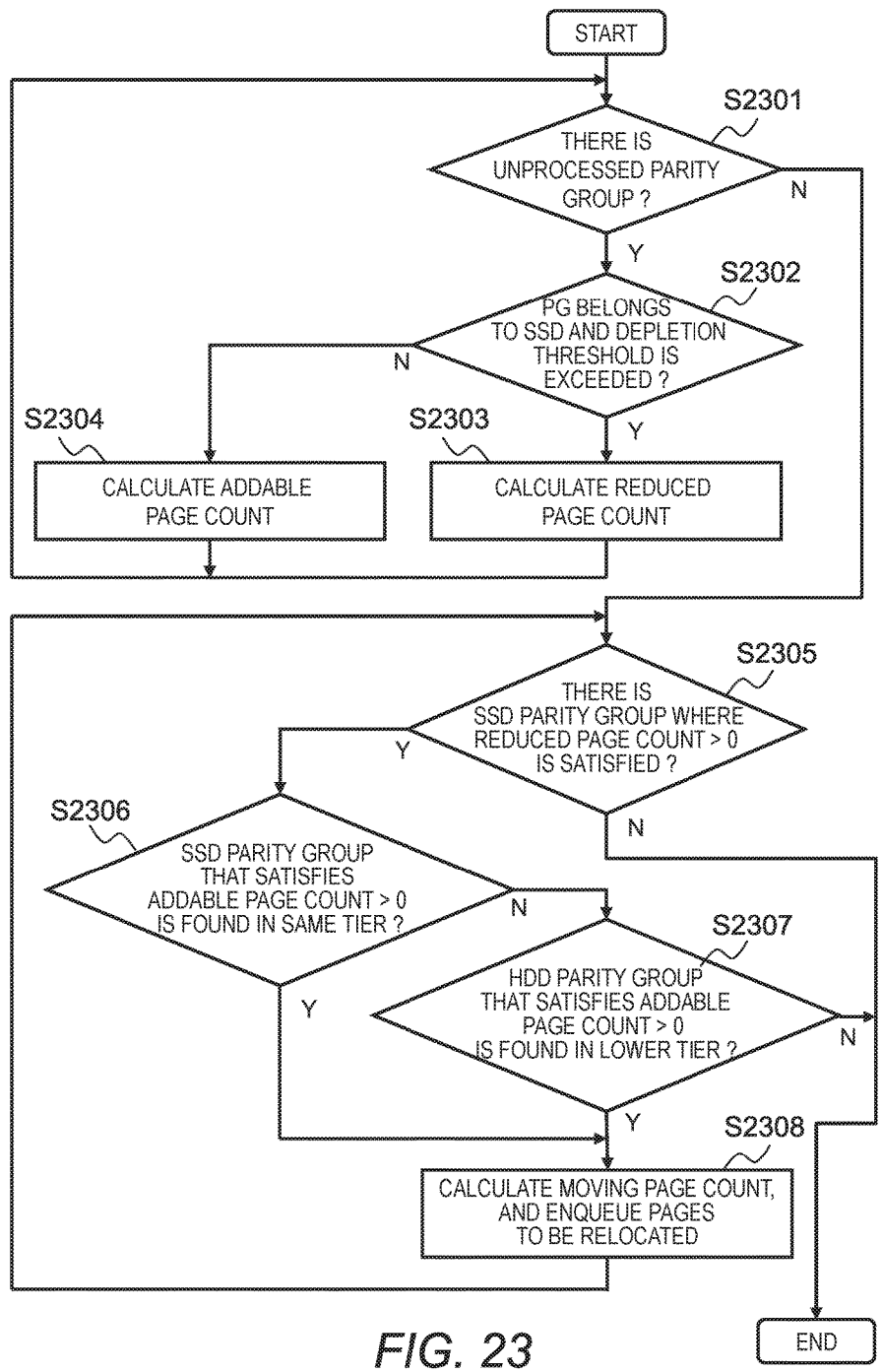
FIG. 23 is a flow chart of processing that is executed by an SSD depletion determining processing program.

FIG. 23 is a flow chart of processing that is executed by the SSD depletion determining processing program 708. This processing is for cyclically determining whether or not an area in a depleted state is found in the drive (SSD) 113, which provides the logical address space 400 that is larger than the physical address space 450 and, in the case where a PG in a depleted state is detected, executing page relocation within the pool 506 to change the PG from the depleted state to a normal state.

For every PG, whether the current used capacity (the number of pages already allocated) exceeds a depletion threshold (for example, 90% of the PG capacity) is checked, the number of pages to be moved out of the depleted PG is calculated, and relocation of the pages is executed. First, in the case where a PG belongs to the SSD and the used capacity of the PG exceeds the depletion threshold ("Y" in Step S2302), the reduced page count is calculated (S2303). The reduced page count can be calculated by, for example, (PG's used capacity−PG's total capacity×80% (a value lower than the depletion threshold))/page size. In the case where the used capacity of a PG does not exceed the depletion threshold, or in the case of a PG that belongs to drives other than the SSD ("N" in Step S2302), the addable page count is calculated (S2304). The addable page count of an SSD PG can be calculated by, for example, (PG's total capacity×depletion threshold−PG's used capacity)/page size. After every PG has been processed, the processing of FIG. 23 proceeds to Step S2305 ("N" in S2301).

In Step S2305, all PGs are searched for a PG that has a positive value as the reduced page count, namely, a PG that exceeds the depletion threshold (S2305), and page relocation for recovery from the depleted state is executed. In the case where an SSD PG that has a positive value as the reduced page count is found ("Y" in Step S2305), the same tier is searched for a PG that has a positive value as the addable page count (S2306). In the case where a PG that has a positive value as the addable page count is found, the number of pages to be moved out is calculated, as many pages as the calculated page count are enqueued into the page relocation execution queue 606, and the processing of Step S2306 moves back to Step S2305. The number of the pages enqueued is the smaller value of the reduced page count and the addable page count. Specifically, in the case where the reduced page count is 100 and the addable page count is 50, only fifty pages are moved between the PG having a reduced page count of 100 and the PG having an addable page count of 50, and Step S2305 and subsequent steps of the processing of FIG. 23 are executed again to select another movement destination PG and attempt to move the remaining fifty pages.

In the case where a movement destination is not found in the same tier ("N" in Step S2306), a lower tier is searched for a PG that has a positive value as the addable page count (S2307). In the case where a PG that has a positive value as the addable page count is found, the number of pages to be moved out of the PG is calculated, and as many pages as the calculated page count are enqueued into the page relocation execution queue 606. The number of pages to be moved can be calculated by the same method that is used when pages are moved within the same tier. In the case where the movement destination is not found even in the lower tier, this program is ended.

Through the processing described above, the system operates so as to avoid depletion of the drive (SSD) 113 within the same tier (Tier 1) if possible. In the case where the entire Tier 1 is depleted, a lower tier is selected as a movement destination. The depleted state of the drive (SSD) 113 is an abnormal state in which write data to be written to a page already allocated to a virtual volume cannot be stored in the drive, and relocation for solving the depleted state is to be determined priority in execution over relocation for load balancing or for SSD life.

FIG. 30 is a diagram for illustrating an example of a screen for setting parameters on a pool-by-pool basis. A pool-by-pool GUI screen 3001 includes a field 3002 to display a pool number by which a setting target pool can be identified, a field 3003 to set on/off of short cycle relocation, a field 3004 to set on/off of detailed settings when on is selected for short cycle relocation, and a field 3005 to set the specifics of detailed settings. Information set on this screen is saved in the setting information table 607.

In the case where the short cycle relocation settings 3003 are set to "off", the determination processing that uses short cycle monitoring results is not executed, and the asynchronous relocation determining processing program 707 executes the tier determination to execute relocation in which promotion to Tier 1 is included. Specifically, monitoring results of the long cycle alone are counted in the monitoring result update & tier determination processing program 703, and Step S1802 and subsequent steps are not executed. In the case where the short cycle relocation settings 3003 are set to "on", on the other hand, the exact processing that is described in this embodiment is executed.

In the case where the short cycle relocation settings 3003 are set to "on", the short cycle detailed settings 3004 can be set and items of the detailed settings 3005 can be entered. In the case where the short cycle detailed settings 3004 are set to "off", the parameters are set to default values or values that are automatically calculated inside the storage system.

A short cycle threshold 3006 is a threshold used in promotion determination of a load per capacity compression unit that is calculated from the short cycle IOPS of the page. The short cycle threshold 3006 is calculated automatically from the tier allocation thresholds 508 or the like inside the storage system. A short cycle-use SSD capacity 3007 is a setting for specifying the storage capacity of the SSD (Tier 1) that is used for short cycle relocation. In the case where the short cycle detailed settings 3004 are set to "off", the storage capacity used for short cycle relocation is determined dynamically.

A queuing method 3008 is for specifying the order of queuing processing steps described with reference to FIG. 11. Options of the queuing method 3008 are "reordering" and "first in, first out (FIFO)". Other commonly known scheduling algorithms (such as HOL and LIFO) may be specified, and pages may be enqueued into and dequeued from the page relocation execution queue 606 by a method suitable for the set algorithm. In the case where the short cycle detailed settings 3004 are set to "off", a default method (for example, "reordering") stored in the setting information table 607 is used. A short cycle load duration (St) 3009 is an item for setting a parameter of a time during which a short cycle load lasts. The duration depends on the pattern or characteristics of the host I/O load, and can therefore be set by the user as in this embodiment. In the case where the short cycle detailed settings 3004 are set to "off", the short cycle load duration (St) may be set to, for example, a default value (e.g., 1 minute) stored in the setting information table 607.

A short cycle counter completion count (N) 3010 is a value at which a counter configured to calculate the short cycle IOPS finishes counting. In the case where the short cycle detailed settings 3004 are set to on and this count is set by the user, the user can set a sensitivity (the length of detection time) to a sudden increase in load. In the case where the short cycle detailed settings 3004 are set to "off", a default value (for example, sixty-four times) can be used as the count N.

A short cycle correction coefficient (M) 3011 is information for setting how difficult promotion is to be, by comparing the load based on the short cycle IOPS and the load based on the long cycle IOPS. In the case where promotion is to be executed in the case where the load based on the long cycle IOPS is 5 or more, for example, the storage system may operate so that promotion is executed in the case where the load based on the short cycle IOPS is M×5 or more. The coefficient may be determined dynamically, may be a default value set in advance, or may be a value specified by the user on this setting screen.

Of the detailed settings items described above, only some items may be set as detailed settings and the rest may be set automatically. The set values of the detailed settings described above may be saved with a label, e.g., "preSet1" attached thereto, so that the field 3005 can be set with ease. While the above-mentioned setting items are set pool by pool in the example given above, values of the setting items may be specified virtual volume by virtual volume, pool volume by pool volume, or page by page other than pool by pool. The setting information table 607 in that case includes a table in which parameters are stored for each target resource (for each virtual volume, for each pool volume, or for each page).

As described above, according to the first embodiment of this invention, each processor 119 (controller) manages the load of I/O from the host 101 and the reduction ratio of write data from the host 101, obtains the reduction ratio of write data compressed by the compression/decompression circuit (data amount reducing module) 218, uses a load per capacity compression unit based on the reduced data size to determine whether data needs to be relocated, and relocates data that is determined as needing relocation between the drive (SSD) 113 and the drive (SAS HDD) 114. Data allocation that takes the I/O load and the data reduction ratio into consideration is therefore accomplished and the data hit ratio in Tier 1 can be improved.

In addition, because write data is compressed by the compression/decompression circuit 218, which is included in the drive (SSD) 113, write data can quickly be compressed by a hardware processing circuit. The performance of I/O from the host 101 therefore does not drop.

The processor 119 obtains the data reduction ratio from the drive (SSD) 113 in the background, at timing different from the issuing of I/O requests from the host 101. The data reduction ratio can therefore be obtained without affecting the performance of I/O from the host 101.

In the case where data that has never been stored in the drive (SSD) 113 is stored in drives other than the drive (SSD) 113, the processor 119 records "100%" as the compression ratio 807 of the data in the dynamic mapping table 601. In the case where data that has been stored in the drive (SSD) 113 is now stored in drives other than the drive (SSD) 113, the reduction ratio of the data obtained when the data has been stored in the drive (SSD) 113 is recorded as the compression ratio 807. The compression ratio of data is thus known before the data is promoted, which means that the load per capacity is calculated with precision and that whether or not promotion is necessary is determined accurately. The hit ratio of Tier 1 can be improved as a result.

The processor 119 also obtains the reduction ratio of data in a partial area of a data area for which the reduction ratio is to be obtained, and records the obtained data reduction ratio as the compression ratio 807 of the entire data area to be obtained. This eliminates the need for the loop processing of Steps S1504 and S1505, and lessens the load of the processing that is executed by the page compression ratio calculating processing program 704.

In the first embodiment described above, the compression/decompression circuit 218 included in the drive (SSD) 113 compresses write data. The drive (SSD) 113 may instead include a deduplication circuit to reduce the amount of data to be stored by executing deduplication processing on a plurality of pieces of write data. Compression processing and deduplication processing may be used in combination by performing deduplication on pieces of data that have undergone compression processing, or by compressing pieces of data that have undergone deduplication. This invention is applicable to any storage system for reducing the amount of data to be stored, whichever of compression processing and deduplication processing is used, before the data is stored in the drive (SSD) 113, and the effects of this invention can be obtained in such storage systems.

The processor 119 predicts whether a storage area of the drive (SSD) 113 that is allocated to a virtual volume is likely to be depleted and, in the case where depletion is predicted, relocates data within the same tier. This way, as many pages as possible that are heavy in I/O load and are therefore to be placed in Tier 1 are placed in Tier 1, and the Tier 1-hitting ratio can be maintained even after recovery from the depleted state. In the case where relocating data within the same tier is difficult, the data is relocated to a lower tier. This ensures recovery from a depleted state unless all PGs in the pool are depleted.

In addition, the hit ratio of Tier 1 is improved even more accurately because the processor 119 determines whether to relocate data with the use of a load per capacity compression unit that is based on the reduced data size and is calculated from the load of I/O in a first determined period (the long cycle) or from the load of I/O in a second determined period (the short cycle).

Second Embodiment

A second embodiment of this invention is described next. The description of the second embodiment focuses on differences from the first embodiment, and the part of the second embodiment that is the same as the first embodiment is not described here.

Figure 24:
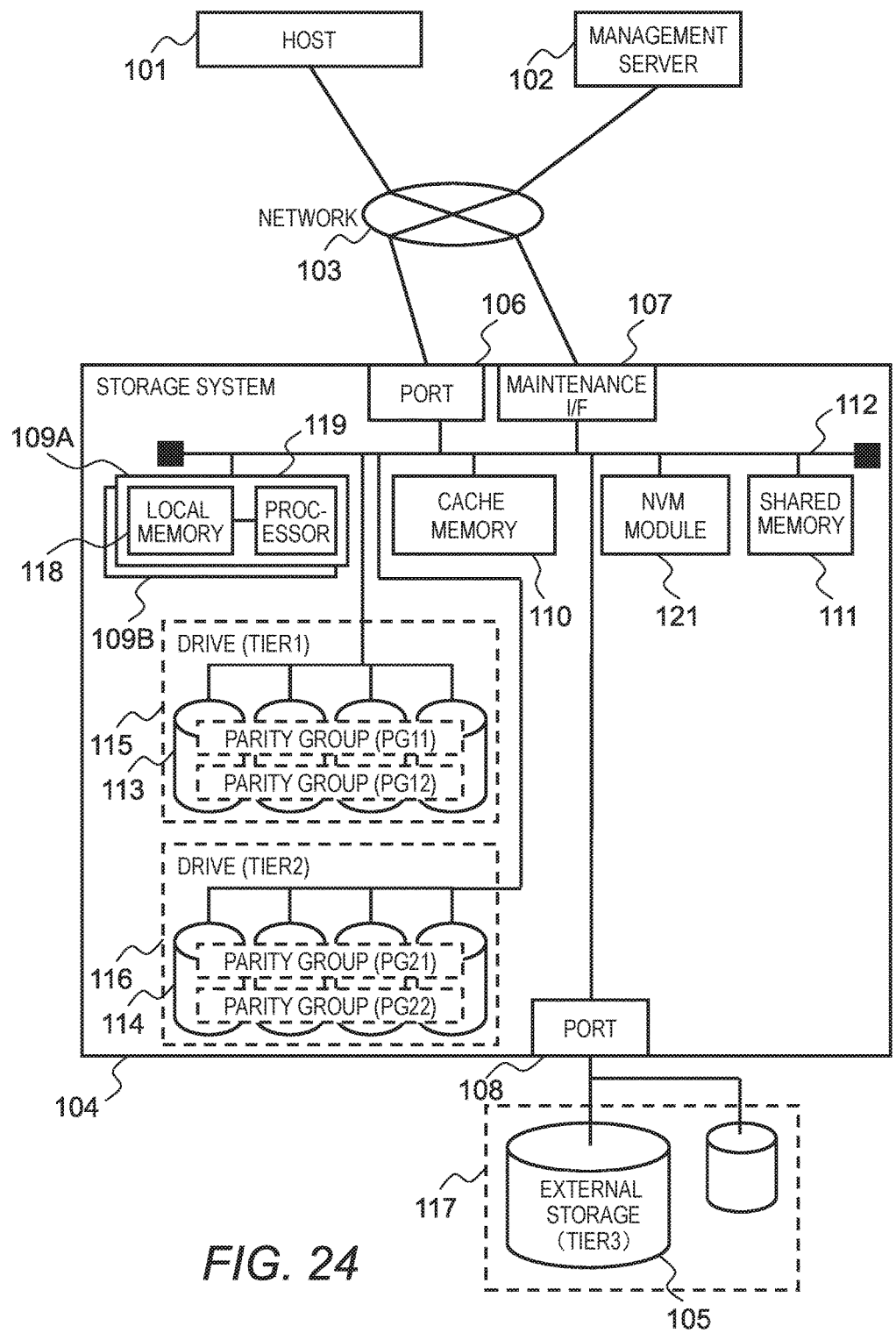
FIG. 24 is a diagram for illustrating an example of a configuration of a computer system according to a second embodiment of this invention.

FIG. 24 is a diagram for illustrating an example of a configuration of a computer system according to the second embodiment of this invention. The second embodiment deals with an example in which an NVM module 121, which includes a processor, non-volatile semiconductor memories, and a fast data compression function (the compression/decompression circuit 218 illustrated in FIG. 25), is added to the components of the storage system of the first embodiment. The NVM module 121 basically operates as a large-capacity cache device into which data stored in a drive is cached as in the cache memory 110 to improve the I/O performance of a host computer. In the case where the second embodiment is applied to deduplication, the NVM module 121 has a deduplication function instead of the compression function.

Figure 25:
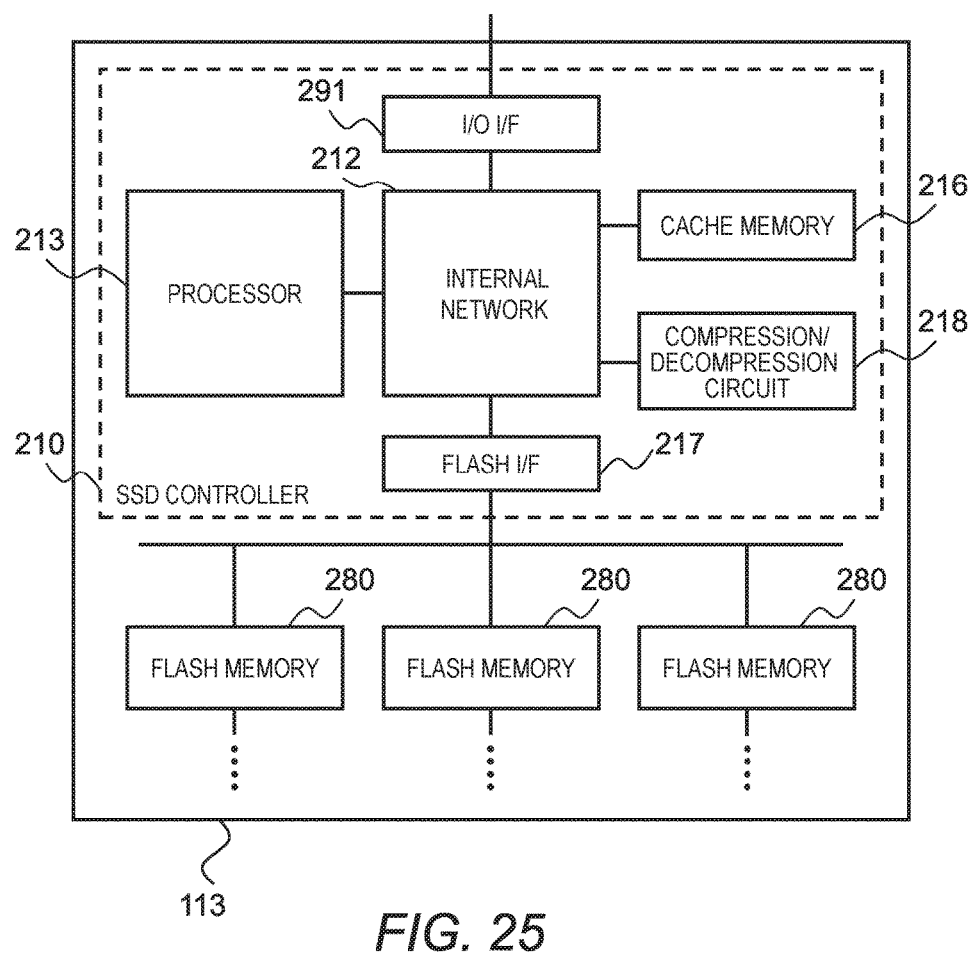
FIG. 25 is a diagram for illustrating an example of a configuration of an NVM module according to the second embodiment.

FIG. 25 is a diagram for illustrating an example of a configuration of the NVM module 121. The basic configuration of the NVM module 121 is the same as that of the drive (SSD) 113 (FIG. 2). A difference is that the NVM module 121 has an I/O I/F 291 as an interface through which I/Os are received from the processors 119 of the storage system. The I/O I/F 291 is, for example, an interface coupled to a PCI bus, and receives read requests and the logical addresses of data to be read, or write requests and write data, from the processors 119.

Figure 26:
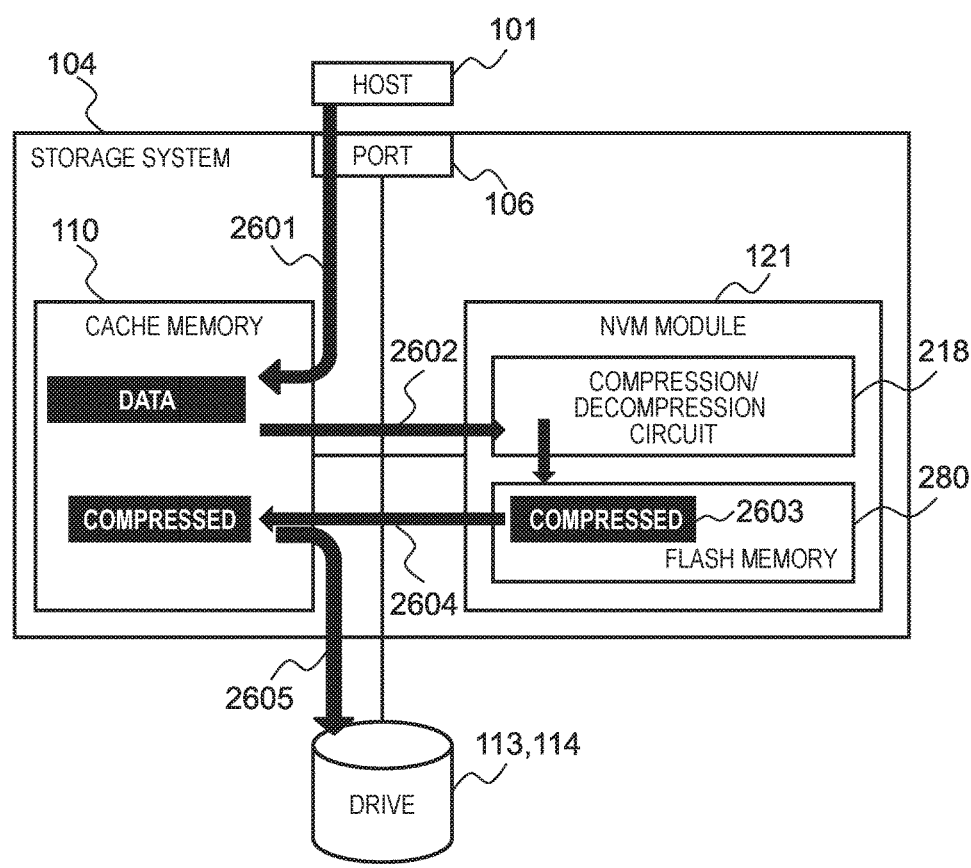
FIG. 26 is a diagram for illustrating a flow of data in I/O processing according to the second embodiment.

FIG. 26 is a diagram for illustrating the flow of data in I/O processing that is executed in the storage system 104. In the case where the storage system 104 receives a write request from the host 101, write data requested by the write request to be written is stored in the NVM module 121 via the cache memory 110. The NVM module 121 compresses the data in the compression/decompression circuit 218, and stores the compressed data in one of the flash memories 280. Thereafter, one of the processors 119 of the storage system 104 issues a read request to the NVM module 121 from the destaging processing program 705, and the compressed data stored in the flash memory 280 is stored in the cache memory 110. The compressed data is then read out of the cache memory 110, and is written to one of the drive 113, the drive 114, and the external storage 105, which are final storage media.

Though not shown, write data stored in the cache memory 110 in the storage system 104 of the second embodiment is written to a storage medium through one of the following routes.

(1) After being compressed by the NVM module 121, the data is written to the drive (SAS HDD) 114, which does not have a compression function, the external storage 105, or the drive (SSD) 113.

(2) The data is written as it is to the drive (SAS HDD) 114, which does not have a compression function, the external storage 105, or the drive (SSD) 113.

(3) The data is compressed by the drive (SSD) 113, which has a compression function, and is then written to a storage area in the drive (SSD) 113.

Figure 27:
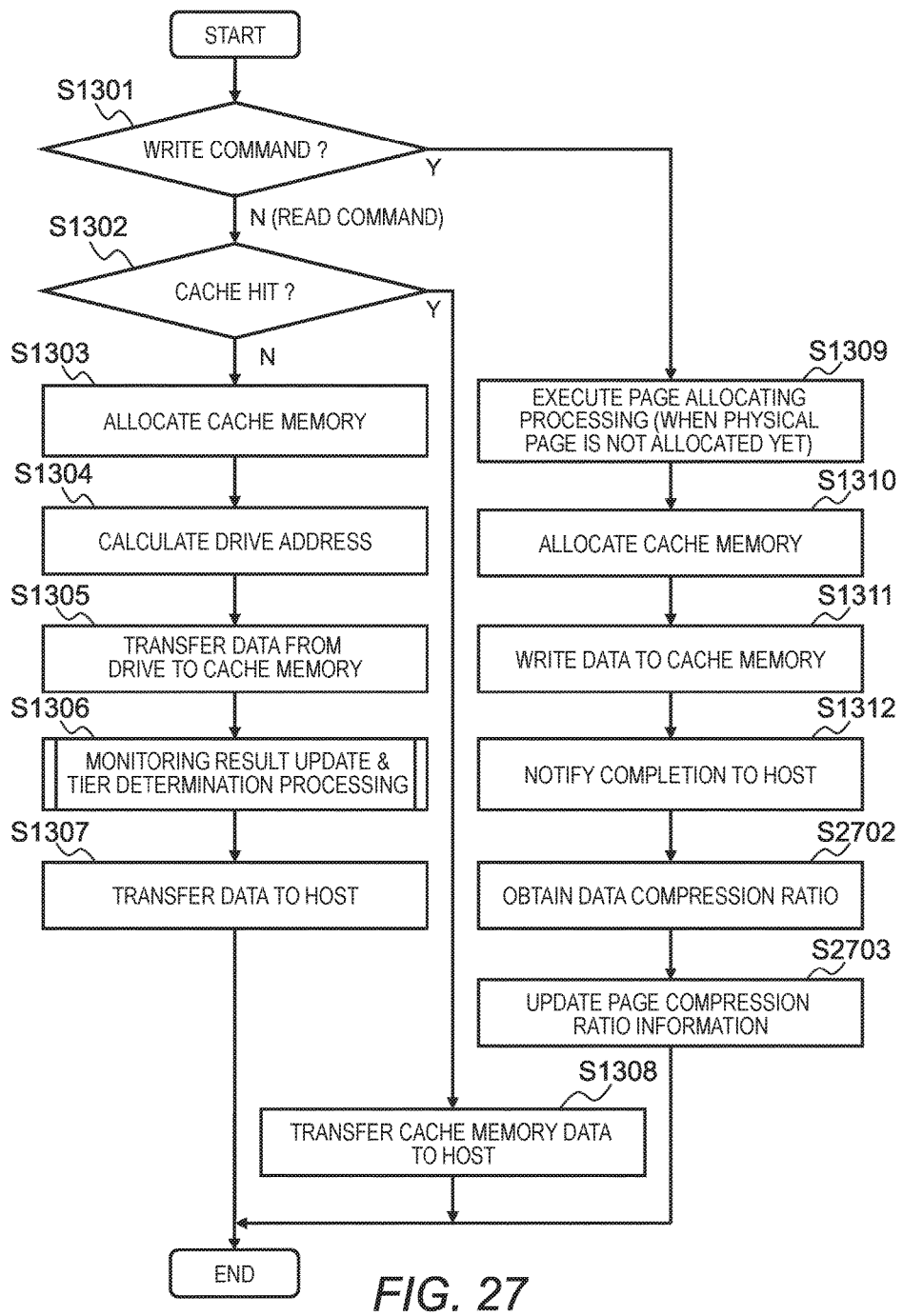
FIG. 27 is a flow chart of reading/writing data in a virtual volume according to the second embodiment.

FIG. 27 is a flow chart of reading/writing data in the virtual volume 501 according to the second embodiment. In the case where the storage system 104 receives an I/O processing request from the host 101, the host I/O processing program 701 is run and this flow is executed. Differences of the flow from the first embodiment are described below.

In the case where the request received from the host is a write request, a completion notification is sent in Step S1312 to the host in response to the request, and the relevant processor 119 then writes the write data stored in the cache memory 110 to the NVM module 121 (S2701). Thereafter, a command for obtaining the compression ratio of the data is issued to the NVM module 121 (S2702). The obtained compression ratio is converted into a page-by-page compression ratio, and the value of the compression ratio 807 in the dynamic mapping table 601 is updated with the page-by-page compression ratio (S2703).

In the first embodiment, the compression ratio of data can be obtained after the data is stored in the drive (SSD) 113. In the second embodiment, the compression ratio of data can be obtained at the time the data is processed by the NVM module 121, before the data is stored in one of the drive 113, the drive 114, and the external storage 105, which are final storage media.

The page compression ratio may not be calculated in sync with host I/O as illustrated in FIG. 27. For instance, the page compression ratio may be calculated in sync with processing of destaging data from the NVM module 121 to a drive which is executed by the destaging processing program 705. Specifically, before an address at which dirty data in the cache is to be stored is obtained in FIG. 14 (S1402), a command for obtaining the compression ratio of the data may be issued to the NVM module 121 (S2702) to convert the obtained compression ratio into a page-by-page compression ratio, and to update the value of the compression ratio 807 in the dynamic mapping table 601 with the page-by-page compression ratio (S2703).

While the NVM module 121 (the compression/decompression circuit 218, which is hardware) compresses data in the second embodiment, data may be compressed by software in the processors 119.

As described above, according to the second embodiment of this invention, where the NVM module 121 having the compression/decompression circuit 218 is provided, write data can be compressed fast by the hardware processing circuit, and a drop in the performance of I/O from the host 101 is therefore prevented.

In addition, because the processors 119 obtain the data reduction ratio from the NVM module 121 at the time an I/O request is received from the host 101, or at the time dirty data in the cache is destaged, the need to execute processing in the background in order to obtain the data reduction ratio is eliminated.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A storage system, comprising:
a first storage device;
a second storage device higher in I/O performance than the first storage device;
a data amount reducing part configured to reduce a data amount of write data from a host computer; and
a controller,
wherein the controller is configured to:
provide the host computer with virtual volumes, each of which includes a plurality of logical areas;
allocate a storage area of one of the first storage device and the second storage device to a logical area specified by the received write request after a write request to one of the virtual volumes is received from the host computer;
store data requested by the write request to be written in the allocated storage area;
relocate the stored data between the first storage device and the second storage device;
change the storage area that is allocated to the specified logical area to a relocation destination storage area;
manage an I/O load of the data and a reduction ratio of the data requested by the write request from the host computer to be written;
calculate a load per capacity reduction unit of the data reduced by the data amount reduction unit by using an I/O count and an inverse number of the reduction ratio;
determine whether or not data relocation is necessary by using the calculated load per capacity reduction unit;
relocate the data that is determined as needing relocation between the first storage device and the second storage device; and
manage a first I/O load in a first determined period and a second I/O load of I/O from the host computer in a second determined period; and
determine whether to relocate data by using a load per capacity reduction unit that is based on the reduced data size and is calculated from the first I/O load and from the second I/O load.

2. The storage system according to claim 1,
wherein the second storage device includes the data amount reducing part, and
wherein the controller is configured to obtain the reduction ratio of the data from the second storage device.

3. The storage system according to claim 2, wherein the controller is configured to:
manage a reduction ratio of the data as "100%" in the case where data that has never been stored in the second storage device is stored in the first storage device; and
manage a reduction ratio of the data that has been obtained in the case where the data was stored in the second storage device in the case where data that has been stored in the second storage device is now stored in the first storage device.

4. The storage system according to claim 2, wherein the controller is configured to:
calculate a reduction ratio of data in a partial area of a data area for which the data reduction ratio is to be obtained; and
manage the calculated data reduction ratio as the reduction ratio of the data area to be obtained.

5. The storage system according to claim 1, further comprising a cache device, which includes a processor, a storage area, and the data amount reducing part.

6. The storage system according to claim 5, wherein the controller is configured to obtain the data reduction ratio from the cache device.

7. The storage system according to claim 1, wherein the data amount reducing part is configured to execute processing of compressing the data that is requested by the write request to be written.

8. The storage system according to claim 1, wherein the controller is configured to:
predict depletion, the depletion being a state in which storage areas receptive of data write are depleted in the second storage device allocated to the virtual volume;

relocate data to the virtual volume that is allocated a storage area of the second storage device in the case where the depletion is predicted; and relocate data stored in the second storage device to the first storage device in the case where data relocation within the second storage device is difficult.

9. The storage system according to claim 1, wherein the second determined period is shorter than the first determined period.

10. A data processing method, which is executed in a storage system, the storage system including:

a first storage device;

a second storage device higher in I/O performance than the first storage device;

a data amount reducing part configured to reduce a data amount of write data from a host computer; and a controller configured to provide the host computer with virtual volumes, each of which includes a plurality of logical areas, the data processing method including steps of:

allocating, by the controller, a storage area of one of the first storage device and the second storage device to a logical area specified by the received write request after a write request to one of the virtual volumes is received from the host computer;

storing, by the controller, data requested by the write request to be written in the allocated storage area;

relocating the stored data between the first storage device and the second storage device;

changing, by the controller, the storage area that is allocated to the specified logical area to a relocation destination storage area;

managing, by the controller, an I/O load of the data and a reduction ratio of the data requested by the write request from the host computer to be written;

calculating, by the controller, a load per capacity reduction unit of the data reduced by the data amount reduction unit by using an I/O count and an inverse number of the reduction ratio;

determining, by the controller, whether or not data relocation is necessary by using the calculated load per capacity reduction unit;

managing, by the controller, a first I/O load in a first determined period and a second I/O load of I/O from the host computer in a second determined period;

determining, by the controller, whether to relocate data by using a load per capacity reduction unit that is based on the reduced data size and is calculated from the first I/O load and from the second I/O load; and relocating the data that is determined as needing relocation between the first storage device and the second storage device.

11. The data processing method according to claim 10, wherein the second storage device includes the data amount reducing part, and wherein the data processing method further includes steps of:

managing, by the controller, a reduction ratio of the data as "100%" in the case where data that has never been stored in the second storage device is stored in the first storage device; and managing, by the controller, a reduction ratio of the data that has been obtained in the case where the data was stored in the second storage device in the case where data that has been stored in the second storage device is now stored in the first storage device.

12. The data processing method according to claim 10, wherein the second storage device includes the data amount reducing part, and wherein the data processing method further includes steps of:

calculating, by the controller, a reduction ratio of data in a partial area of a data area for which the data reduction ratio is to be obtained; and managing, by the controller, the calculated data reduction ratio as the reduction ratio of the data area to be obtained.

13. The data processing method according to claim 10, wherein the storage system further includes a cache device, which includes a processor, a storage area, and the data amount reducing part, and wherein the data processing method further includes a step of obtaining, by the controller, the data reduction ratio from the cache device.

14. The data processing method according to claim 10, wherein the second determined period is shorter than the first determined period.

* * * * *